US011412503B2

(12) United States Patent
Chen et al.

(10) Patent No.: US 11,412,503 B2
(45) Date of Patent: Aug. 9, 2022

(54) DATA CHANNEL-REFERENCED RESOURCE ALLOCATION FOR A CONTROL CHANNEL

(71) Applicant: QUALCOMM Incorporated, San Diego, CA (US)

(72) Inventors: Wanshi Chen, San Diego, CA (US); Peter Gaal, San Diego, CA (US); Hao Xu, San Diego, CA (US); Renqiu Wang, San Diego, CA (US); Tingfang Ji, San Diego, CA (US); Wei Zeng, San Diego, CA (US); Yi Huang, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 464 days.

(21) Appl. No.: 15/465,498

(22) Filed: Mar. 21, 2017

(65) Prior Publication Data

US 2018/0049173 A1    Feb. 15, 2018

Related U.S. Application Data

(60) Provisional application No. 62/416,613, filed on Nov. 2, 2016, provisional application No. 62/374,721, filed on Aug. 12, 2016.

(51) Int. Cl.
*H04W 72/04* (2009.01)
*H04L 5/00* (2006.01)
*H04W 76/28* (2018.01)
*H04W 88/02* (2009.01)

(52) U.S. Cl.
CPC ......... *H04W 72/044* (2013.01); *H04L 5/0048* (2013.01); *H04W 72/0413* (2013.01); *H04W 72/0446* (2013.01); *H04W 76/28* (2018.02); *H04W 88/02* (2013.01)

(58) Field of Classification Search
None
See application file for complete search history.

(56) References Cited

U.S. PATENT DOCUMENTS

2011/0274059 A1* 11/2011 Brown ............... H04L 27/0008
                                                    370/329
2012/0044889 A1*  2/2012 Jen .................. H04L 1/1854
                                                    370/329
2012/0057449 A1*  3/2012 Takaoka ............ H04B 1/713
                                                    370/210

(Continued)

OTHER PUBLICATIONS

ISA/EP, International Search Report and Written Opinion of the International Searching Authority, Int'i Application No. PCT/US2017/044282, dated Oct. 23, 2017, European Patent Office, Rijswijk, NL, 16 pgs.

*Primary Examiner* — Steve R Young
(74) *Attorney, Agent, or Firm* — Holland & Hart LLP

(57) ABSTRACT

Methods, systems, and devices for wireless communication are described for a data channel-referenced resource allocation for a control channel. In an implementation, a user equipment (UE) may identify, for a transmission time interval (TTI), a first uplink resource allocation to the UE of a first channel. The UE may determine, based at least in part on the first uplink resource allocation of the first channel, a second uplink resource allocation of a second channel to the UE. The UE may transmit, during the TTI, the first channel and the second channel.

30 Claims, 15 Drawing Sheets

(56) References Cited

U.S. PATENT DOCUMENTS

| | | | |
|---|---|---|---|
| 2012/0113831 A1* | 5/2012 | Pelletier | H04L 5/0053 370/252 |
| 2013/0229998 A1* | 9/2013 | Noh | H04L 5/001 370/329 |
| 2015/0282158 A1 | 10/2015 | Chen et al. | |
| 2016/0135214 A1 | 5/2016 | Chendamarai et al. | |
| 2017/0245313 A1* | 8/2017 | Kim | H04W 76/14 |
| 2017/0347326 A1* | 11/2017 | Dinan | H04W 52/246 |

* cited by examiner

DATA CHANNEL-REFERENCED RESOURCE ALLOCATION FOR A CONTROL CHANNEL

CROSS REFERENCES

The present Applications for patent claims priority to U.S. Provisional Patent Application No. 62/374,721 by Chen, et al., entitled "Data Channel-Referenced Resource Allocation for a Control Channel," filed Aug. 12, 2016, assigned to the assignee hereof; and to U.S. Provisional Patent Application No. 62/416,613 by Chen, et al., entitled "Data Channel-Referenced Resource Allocation for a Control Channel," filed Nov. 2, 2016, assigned to the assignee hereof, the entireties of each of which are expressly incorporated herein for any and all purposes.

INTRODUCTION

The following relates generally to wireless communication, and more specifically to data channel-referenced resource allocation for a control channel.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include code division multiple access (CDMA) systems, time division multiple access (TDMA) systems, frequency division multiple access (FDMA) systems, and orthogonal frequency division multiple access (OFDMA) systems, (e.g., a Long Term Evolution (LTE) system). A wireless multiple-access communications system may include a number of base stations, each simultaneously supporting communication for multiple communication devices, which may be otherwise known as user equipment (UE).

Single-Carrier Frequency Division Multiple Access (SC-FDMA), like Orthogonal Frequency Division Multiplexing (OFDM), divides transmission bandwidth into multiple parallel subcarriers, with the orthogonality between the subcarriers being maintained in frequency-selective channels by the use of a Cyclic Prefix (CP). The use of a CP prevents Inter-Symbol Interference (ISI) between SC-FDMA information blocks and OFDM employing a CP may also be known as CP-OFDM. However, unlike OFDM, in SC-FDMA the signal modulated onto a given subcarrier is a linear combination (typically via a discrete Fourier Transform (DFT) precoding operation) of all the data symbols transmitted at the same time instant. Thus in each symbol period, all the transmitted subcarriers of an SC-FDMA signal carry a component of each modulated data symbol. This gives SC-FDMA its single-carrier property, which results in the lower Cubic Metric (CM) and Peak to Average Power Ratio (PAPR) than pure multicarrier transmission schemes such as OFDM. SC-FDMA may also be known as DFT-spread-OFDM (DFT-S-OFDM).

In LTE/LTE-Advanced (LTE-A) systems, UEs typically transmit on the uplink to a base station using SC-FDM waveforms, whereas base stations typically transmit using OFDM waveforms. A disadvantage of OFDM is that transmitted signal power is subject to rather large variations that can cause problems for a transmitter's power amplifier. Base stations have expensive power amplifiers that can handle the large variations, whereas a UE's power amplifier is cheaper and cannot. UEs instead use an SC-FDM waveform for uplink transmissions because SC-FDM has smaller variations in transmitted signal power.

One type of information a UE communicates to a base station is uplink control information (UCI). UCI is control signaling that may include any combination of (1) hybrid automatic repeat request (HARD) ACKnowledgement/Negative ACKnowledgement (ACK/NAK) information for one or more component carriers, (2) periodic channel state information (CSI) or aperiodic CSI feedback for one or more component carriers, (3) a scheduling request (SR) and/or (4) a buffer status report (BSR). In a transmission time interval in which no data transmission on a Physical Uplink Shared Channel (PUSCH) is occurring, UCI is carried on a Physical Uplink Control Channel (PUCCH). When UCI is transmitted in a TTI with concurrent data transmission, the UCI may be carried on the PUCCH or multiplexed with the data on the PUSCH. These techniques for concurrent transmission of UCI with data may cause uncertainty in transmission reliability.

SUMMARY

A method of wireless communication is described. The method may include identifying, for a transmission time interval (TTI), a first uplink resource allocation to a user equipment (UE) of a first channel, determining, based at least in part on the first uplink resource allocation of the first channel, a second uplink resource allocation of a second channel to the UE, and transmitting, during the TTI, the first channel and the second channel.

An apparatus for wireless communication is described. The apparatus may include means for identifying, for a TTI, a first uplink resource allocation to a UE of a first channel, means for determining, based at least in part on the first uplink resource allocation of the first channel, a second uplink resource allocation of a second channel to the UE, and means for transmitting, during the TTI, the first channel and the second channel.

Another apparatus for wireless communication is described. The apparatus may include a processor, memory in electronic communication with the processor, and instructions stored in the memory. The instructions may be operable to cause the processor to identify, for a TTI, a first uplink resource allocation to a UE of a first channel, determine, based at least in part on the first uplink resource allocation of the first channel, a second uplink resource allocation of a second channel to the UE, and transmit, during the TTI, the first channel and the second channel.

A non-transitory computer readable medium for wireless communication is described. The non-transitory computer-readable medium may include instructions operable to cause a processor to identify, for a TTI, a first uplink resource allocation to a UE of a first channel, determine, based at least in part on the first uplink resource allocation of the first channel, a second uplink resource allocation of a second channel to the UE, and transmit, during the TTI, the first channel and the second channel.

In some examples of the method, apparatus, and non-transitory computer-readable medium described above, the first channel may be a data channel and the second channel may be a control channel.

In some examples of the method, apparatus, and non-transitory computer-readable medium described above, the first uplink resource allocation of the first channel and the second uplink resource allocation of the second channel may be physically contiguous at least during a portion of the TTI.

In some examples of the method, apparatus, and non-transitory computer-readable medium described above, the second channel may be mapped to a first frequency location for a first portion of the TTI and a second frequency location for a second portion of the TTI.

In some examples of the method, apparatus, and non-transitory computer-readable medium described above, the determining of the second uplink resource allocation comprises: locating the second channel in a frequency resource adjacent to at least one of a lower boundary or an upper boundary of the first uplink resource allocation.

In some examples of the method, apparatus, and non-transitory computer-readable medium described above, a size of the second uplink resource allocation of the second channel may be determined based at least in part on at least one of an indication in a control channel, a size of the first uplink resource allocation of the first channel, a payload size of information carried on the second channel, a location of the first uplink resource allocation of the first channel, a format of the second channel, a duration of the TTI, or a combination thereof.

Some examples of the method, apparatus, and non-transitory computer-readable medium described above may further include processes, features, means, or instructions for information of a first type to be mapped to the first channel and information of a second type to be mapped to the second channel. In some examples of the method, apparatus, and non-transitory computer-readable medium described above, the information of the first type comprises data and the information of the second type comprises uplink control information.

Some examples of the method, apparatus, and non-transitory computer-readable medium described above may further include processes, features, means, or instructions for mapping a first portion of the uplink control information to the first channel. Some examples of the method, apparatus, and non-transitory computer-readable medium described above may further include processes, features, means, or instructions for mapping a second portion of the uplink control information to the second channel.

Some examples of the method, apparatus, and non-transitory computer-readable medium described above may further include processes, features, means, or instructions for receiving an allocation message indicating the first uplink resource allocation and a number of subcarriers for the second channel. Some examples of the method, apparatus, and non-transitory computer-readable medium described above may further include processes, features, means, or instructions for receiving an allocation message indicating the first uplink resource allocation.

In some examples of the method, apparatus, and non-transitory computer-readable medium described above, the first uplink resource allocation may have a first granularity and the second uplink resource allocation may have a second granularity different from the first granularity.

In some examples of the method, apparatus, and non-transitory computer-readable medium described above, the second channel may be orthogonalized to a channel for at least one other UE transmitted in at least a portion of the second uplink resource allocation using a spreading code or a precoding matrix.

In some examples of the method, apparatus, and non-transitory computer-readable medium described above, the determining of the second uplink resource allocation comprises: locating the second channel in a frequency resource interposed within the first uplink resource allocation.

In some examples of the method, apparatus, and non-transitory computer-readable medium described above, the second channel may be not adjacent to a lower frequency boundary or an upper frequency boundary of the first uplink resource allocation.

In some examples of the method, apparatus, and non-transitory computer-readable medium described above, the transmitting, during the TTI, the first channel and the second channel comprises: generating a cyclic prefix orthogonal frequency division multiplexing (CP-OFDM) waveform for the first channel. Some examples of the method, apparatus, and non-transitory computer-readable medium described above may further include processes, features, means, or instructions for generating a discrete Fourier transform spread orthogonal frequency division multiplexing (DFT-S-OFDM) waveform for the second channel.

In some examples of the method, apparatus, and non-transitory computer-readable medium described above, the transmitting, during the TTI, the first channel and the second channel comprises: generating a DFT-S-OFDM waveform for the first channel. Some examples of the method, apparatus, and non-transitory computer-readable medium described above may further include processes, features, means, or instructions for generating a DFT-S-OFDM waveform for the second channel.

Some examples of the method, apparatus, and non-transitory computer-readable medium described above may further include processes, features, means, or instructions for determining that the UE may be to use a DFT-S-OFDM waveform or a CP-OFDM waveform during a second TTI. Some examples of the method, apparatus, and non-transitory computer-readable medium described above may further include processes, features, means, or instructions for determining to multiplex data information with control information into the first channel for the second TTI. Some examples of the method, apparatus, and non-transitory computer-readable medium described above may further include processes, features, means, or instructions for transmitting, during the second TTI, the multiplexed data and control information in the first channel using the DFT-S-OFDM waveform or the CP-OFDM waveform.

In some examples of the method, apparatus, and non-transitory computer-readable medium described above, the transmitting, during the TTI, the first channel and the second channel comprises: determining, for the first channel, a plurality of precoding matrices associated with a plurality of layers for the TTI. Some examples of the method, apparatus, and non-transitory computer-readable medium described above may further include processes, features, means, or instructions for applying the plurality of precoding matrices to precode information of a first type for transmission of the first channel over the plurality of layers. Some examples of the method, apparatus, and non-transitory computer-readable medium described above may further include processes, features, means, or instructions for applying one of the plurality of precoding matrices to precode information of a second type for transmission of the second channel over one of the plurality of layers.

In some examples of the method, apparatus, and non-transitory computer-readable medium described above, transmitting, during the TTI, the first channel and the second channel comprises: time-division multiplexing the first channel with the second channel during the TTI. Some examples of the method, apparatus, and non-transitory computer-readable medium described above may further include processes, features, means, or instructions for determining to time-division multiplex the first channel with the second channel based at least in part on a duration of the TTI, a size of the first uplink resource allocation of the first channel, a payload size of information carried on the second channel, or combinations thereof.

DETAILED DESCRIPTION

Techniques of the present disclosure include a data channel-referenced resource allocation for a control channel for enhanced transmission of uplink control information (UCI). A control channel that is transmitted using resources of a physical uplink shared channel (PUSCH) region frees data transmissions from having to meet stringent block error rate (BLER) requirements for UCI and improves transmission power level management as compared to conventional techniques. In an example, a UE may receive an uplink resource allocation indicating a group of allocated resource blocks in the PUSCH region that have been allocated to the UE for its data transmission. The UE may determine an allocation for transmission of a control channel that is adjacent to at least a portion of the allocated resource blocks. The UE may transmit, during a transmission time interval, uplink data mapped to the data channel and uplink control data mapped to the control channel.

Aspects of the disclosure are initially described in the context of a wireless communications system. The wireless communications system may piggyback a control channel on a data channel and transport UCI on the piggybacked control channel. Aspects of the disclosure are further illustrated by and described with reference to apparatus diagrams, system diagrams, and flowcharts that relate to data channel-referenced resource allocation for a control channel.

Figure 1:
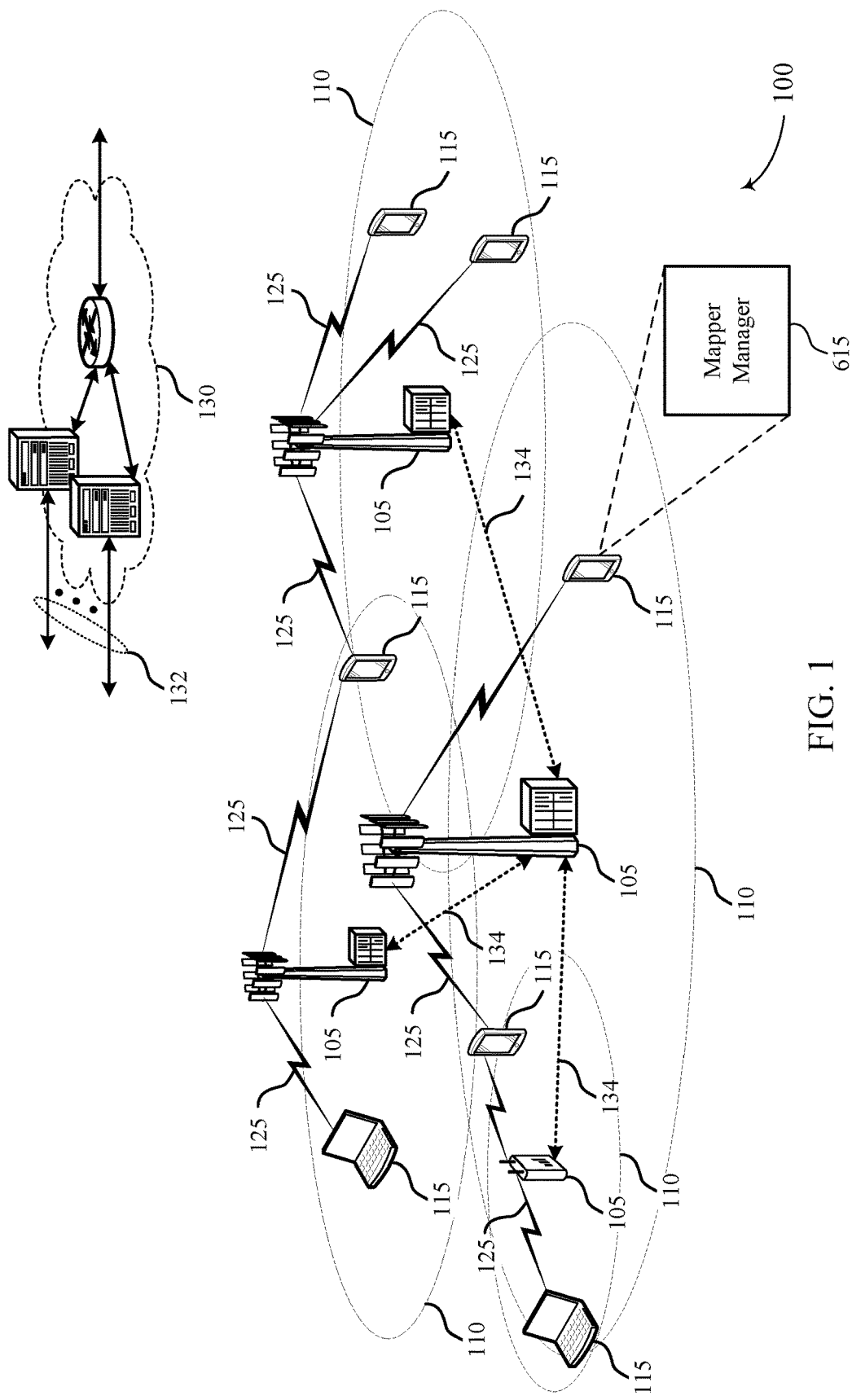
FIG. 1 illustrates an example of a system for wireless communication that supports data channel-referenced resource allocation for a control channel in accordance with one or more aspects of the present disclosure.

FIG. 1 illustrates an example of a wireless communications system 100 in accordance with one or more aspects of the present disclosure. The wireless communications system 100 includes base stations 105, UEs 115, and a core network 130. The wireless communications system 100 may be an LTE, LTE-Advanced, new radio (NR), or 5G network. In NR or 5G networks, the base stations 105 may include access nodes (ANs), central units (CUs), and/or distributed units (DUs). An AN may be an example of a new radio base station (NR BS), a new radio Node-B (NR NB), a network node (NN), or the like. A CU may be an example of a central node (CN), an access node controller (ANC), or the like. Each of the DUs may be an example of an edge node (EN), an edge unit (EU), a radio head (RH), a smart radio head (SRH), a transmission and reception point (TRP), or the like.

Base stations 105 may wirelessly communicate with UEs 115 via one or more base station antennas. Each base station 105 may provide communication coverage for a respective geographic coverage area 110. Communication links 125 shown in wireless communications system 100 may include UL transmissions from a UE 115 to a base station 105, or DL transmissions, from a base station 105 to a UE 115. UEs 115 may be dispersed throughout the wireless communications system 100, and each UE 115 may be stationary or mobile. A UE 115 may also be referred to as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. A UE 115 may also be a cellular phone, a personal digital assistant (PDA), a wireless modem, a wireless communication device, a handheld device, a tablet computer, a laptop computer, a cordless phone, a personal electronic device, a handheld device, a personal computer, a wireless local loop (WLL) station, an Internet of things (IoT) device, an Internet of Everything (IoE) device, a machine type communication (MTC) device, an appliance, an automobile, or the like.

The UE 115 may include a mapper manager 615 for data channel-referenced resource allocation for a control channel for enhanced transmission of uplink control information (UCI). The mapper manager 615 may receive an uplink resource allocation indicating a group of allocated resource blocks in a PUSCH region that have been allocated to the UE 115 for its data transmission. The mapper manager 615 may determine an allocation for transmission of a control channel that is adjacent to at least a portion of the allocated resource blocks. The mapper manager 615 may transmit, during a transmission time interval, uplink data mapped to the data channel and uplink control data mapped to the control channel. Additional aspects of the mapper manager 615 are described in FIG. 6.

Base stations 105 may communicate with the core network 130 and with one another. For example, base stations 105 may interface with the core network 130 through backhaul links 132 (e.g., S1, etc.). Base stations 105 may communicate with one another over backhaul links 134 (e.g., X2, etc.) either directly or indirectly (e.g., through core network 130). Base stations 105 may perform radio configuration and scheduling for communication with UEs 115, or may operate under the control of a base station controller (not shown). In some examples, base stations 105 may be macro cells, small cells, hot spots, or the like. Base stations 105 may also be referred to as eNodeBs (eNBs) 105.

In some cases, a base station 105 and a user equipment (UE) 115 may communicate using carrier frequencies at 6 GHz or less (sub-6), or higher such as 28 GHz, 60 GHz, etc. which is also known as millimeter wave communications.

Each component can have a bandwidth of, e.g., 1.4, 3, 5, 10, 15, 20 MHz, etc. In some cases, a base station 105 and a UE 115 may communicate using more than one carrier in a carrier aggregation (CA) configuration. Each aggregated carrier is referred to as a component carrier (CC). In some cases, the number of CCs can be limited to, e.g., a maximum of five 20 MHz carriers, giving maximum aggregated bandwidth is 100 MHz. In frequency division duplexing (FDD), the number of aggregated carriers can be different in downlink (DL) and uplink (UL). The number of UL component carriers may be equal to or lower than the number of DL component carriers. The individual component carriers can also be of different bandwidths. For time division duplexing (TDD), the number of CCs as well as the bandwidths of each CC will normally be the same for DL and UL. Component carriers may be arranged in a number of ways. For example, a carrier aggregation (CA) configuration may be based at least in part on contiguous component carriers within the same operating frequency band, i.e., called intra-band contiguous CA. Non-contiguous allocations can also be used, where the component carriers may be either be intra-band, or inter-band.

Within a CA configuration, certain CCs may be configured differently from other CCs of the CA configuration. For example, the CA configuration may include a primary CC (PCC or PCell) and one or several secondary CCs (SCC or SCell). The PCell may be configured to carry uplink and downlink control information on PUCCH and PDCCH/ePDCCH, respectively. PDCCH on a PCell may include scheduling information for resources of the PCell or for resources of one or more SCells, or both. An SCell may include PDCCH, which may include scheduling information for resources of that SCell or for one or more other SCells. Some SCells may be configured for downlink communications and may not be configured for uplink communications, while a PCell may be configured for both uplink and downlink communications. Various carriers of the CA may be TDD or FDD configured. A CA configuration may include both TDD and FDD configured carriers.

In some cases, wireless communications system 100 may utilize enhanced component carriers (eCCs). In some examples, NR or 5G networks may utilize eCCs, and the use of eCCs over a shared spectrum may be referred to as New Radio for Shared Spectrum (NR-SS). An SCell may, for instance, be an eCC. An eCC may be characterized by one or more features including: wider bandwidth, shorter symbol duration, shorter TTIs, and modified control channel configuration. In some cases, an eCC may be associated with a carrier aggregation configuration or a dual connectivity configuration (e.g., when multiple serving cells have a suboptimal or non-ideal backhaul link). An eCC may also be configured for use in unlicensed spectrum or shared spectrum (where more than one operator is allowed to use the spectrum). An eCC characterized by wide bandwidth may include one or more segments that may be utilized by UEs 115 that are not capable of monitoring the whole bandwidth or prefer to use a limited bandwidth (e.g., to conserve power). In some cases, an eCC may utilize a different symbol duration than other CCs, which may include use of a reduced symbol duration as compared with symbol durations of the other CCs. A shorter symbol duration is associated with increased subcarrier spacing. A device, such as a UE 115 or base station 105, utilizing eCCs may transmit wideband signals (e.g., 20, 40, 60, 80 MHz, etc.) at reduced symbol durations (e.g., 16.67 microseconds). A TTI in eCC may consist of one or multiple symbols. In some cases, the TTI duration (that is, the number of symbols in a TTI) may be variable.

In conventional UCI transmission mechanisms, a UE may be allocated resources in a physical uplink control channel (PUCCH) region designated for carrying UCI. For TTIs without a scheduled data transmission, the UE transmits UCI to a base station in a control channel transmission on the designated resources in the PUCCH according to a PUCCH format. In LTE, for example, PUCCH has several formats (e.g., PUCCH formats 1/2/3/4/5) and the UCI may be carried within the PUCCH in accordance with a particular one of the formats.

If, however, a UE is scheduled for a data transmission in the same TTI as the UCI transmission, conventionally there are two ways for a UE 115 to transmit UCI. In a first way, the UE 115 multiplexes the UCI with the data channel (e.g., within the PUSCH region). To do so, the UE 115 may puncture symbols occupied by an uplink shared channel (e.g., for ACK/NAK) or concatenate the UCI with data (e.g., for CSI). A benefit of such an implementation is that the UE 115 may use an SC-FDM waveform to transport the UCI within the data transmission. This implementation, however, has drawbacks. Satisfying a BLER requirement for UCI can be difficult to achieve, especially given that time and frequency resources of the PUSCH region are dynamically allocated to the UE 115 for carrying the data transmission and may vary from TTI to TTI (e.g., dynamically allocated small or large bandwidths, modulation and coding schemes (MCSs) may vary, a different number of spatial layers may be used, and the like). Moreover, control and data channels have different requirements for inter-cell interference levels that impact UCI. Further, UCI performance may be controlled via semi-static offsets configured specifically for a UE via radio resource control (RRC). To meet the BLER requirements of UCI, the UE is typically configured very conservatively to ensure a worst case BLER scenario is met, making the UE configuration very inefficient.

Figure 2:
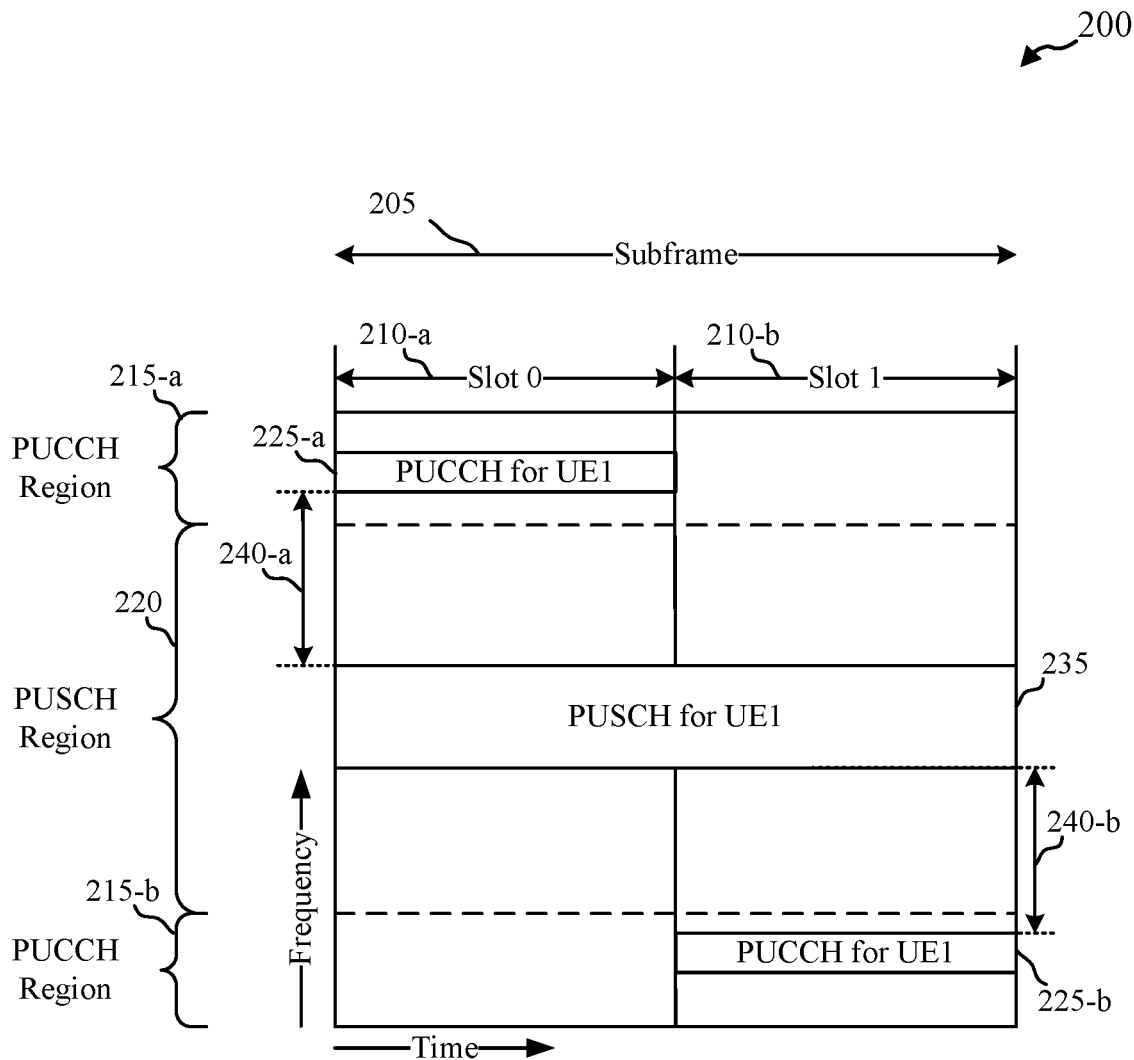
FIG. 2 illustrates an example of a subframe in accordance with one or more aspects of the present disclosure.

In a second way, at least some UCI is carried by a PUCCH in parallel with PUSCH. FIG. 2 illustrates an example diagram 200 of a subframe carrying PUCCH in parallel with PUSCH in accordance with one or more aspects of the present disclosure. A subframe 205 may correspond to resources in frequency and time and may be divided into two timeslots 210-a, 210-b. Frequency is shown from top to bottom, and time is shown from left to right. The resources may be divided into PUCCH and PUSCH regions. PUCCH regions 215-a, 215-b are located at the lower and upper portions of the subframe, and PUSCH region 220 may occupy the region therebetween. The PUCCH and PUSCH regions include time and frequency resources that may be shared by multiple UEs, and a base station 105 may allocate a portion of the PUCCH and PUSCH regions to the UEs. As depicted, PUCCH 225 and PUSCH 235 are allocated to UE1 and PUCCH 225 frequency hops from slot 0 to slot 1 (see PUCCH 225-a, 225-b). In a typical scenario, PUCCH carries at least some UCI. PUCCH may carry ACK/NAK if PUCCH format 1a/1b or 3 is used and PUSCH carries CSI. In another typical scenario, PUCCH carries ACK/NAK and CSI if PUCCH format 4 or format 5 is used, and PUSCH carries only uplink data.

A benefit of transmitting at least some UCI on PUCCH in parallel with a PUSCH is that UCI quality can be ensured to meet BLERs for non-power-limited UEs. Parallel transmission of PUCCH 225 and PUSCH 235 in the typical scenarios discussed above, however, may cause a number of issues. First, PUCCH and PUSCH cannot be transmitted on a single SC-FDM waveform because PUCCH and PUSCH resources allocated to a UE are separated in frequency. For instance, as seen in FIG. 2, PUSCH 235 of UE1 is separated in frequency from PUCCH 225-*a* (see 240-*a*) and PUCCH 225-*b* (see 240-*b*). Second, allocation of frequency resources to a UE (e.g., UE1) to carry PUCCH does not have any relationship to what frequency resources have been allocated to carry that UE's PUSCH. Thus, PUCCH and PUSCH resources allocated to a UE are not contiguous in frequency. Because PUCCH and PUSCH do not occupy a contiguous frequency range, up to 10 decibel (dB) maximum power reduction (MPR) may be necessary to meet emission requirements. For example, a UE 115 may transmit with 23 dbm (decibel milliwatts) nominal power and be limited to a max power of 13 dbm based on the 10 dB MPR. Transmitting PUCCH and PUSCH on non-contiguous frequencies without maximum power reduction (MPR) may result in spurious emissions interfering with other users.

In some examples, the UE 115 may employ a data channel-referenced resource allocation for a control channel to provide an improved mechanism for transporting UCI. For a data channel-referenced resource allocation, the UE 115 may determine where within a resource grid a base station 105 has allocated resource blocks to the UE 115 for a data channel, and select at least a portion of a resource block for a control channel adjacent in frequency to the allocated resource blocks of the data channel.

The examples described herein may provide for improved techniques for transmitting UCI by piggy backing a control channel on a data channel. In some instances, the technique used for transmitting a control channel and a data channel may be waveform dependent.

In an example, independent waveforms may be used to transport PUCCH and PUSCH. For instance, PUCCH may be transported using a DFT-spread-OFDM (DFT-S-OFDM) waveform and PUSCH may be transported using either a DFT-S-OFDM waveform or a cyclic prefix-OFDM (CP-OFDM) waveform. In some instances, the UE 115 or base station 105 may use the value of a modulating and coding scheme (MCS) index to determine whether PUSCH is to be transported using a DFT-S-OFDM waveform or a CP-OFDM waveform, with a DFT-S-OFDM waveform being used when a MCS index is low (e.g., less than or equal to a defined MCS index) and a CP-OFDM waveform being used when a MCS index is high (e.g., greater than the defined MCS index).

In another example, a waveform may be used to transport both PUCCH and PUSCH. For example, PUCCH may be multiplexed with PUSCH, and a DFT-S-OFDM waveform may be used to transport both.

Figure 3A:
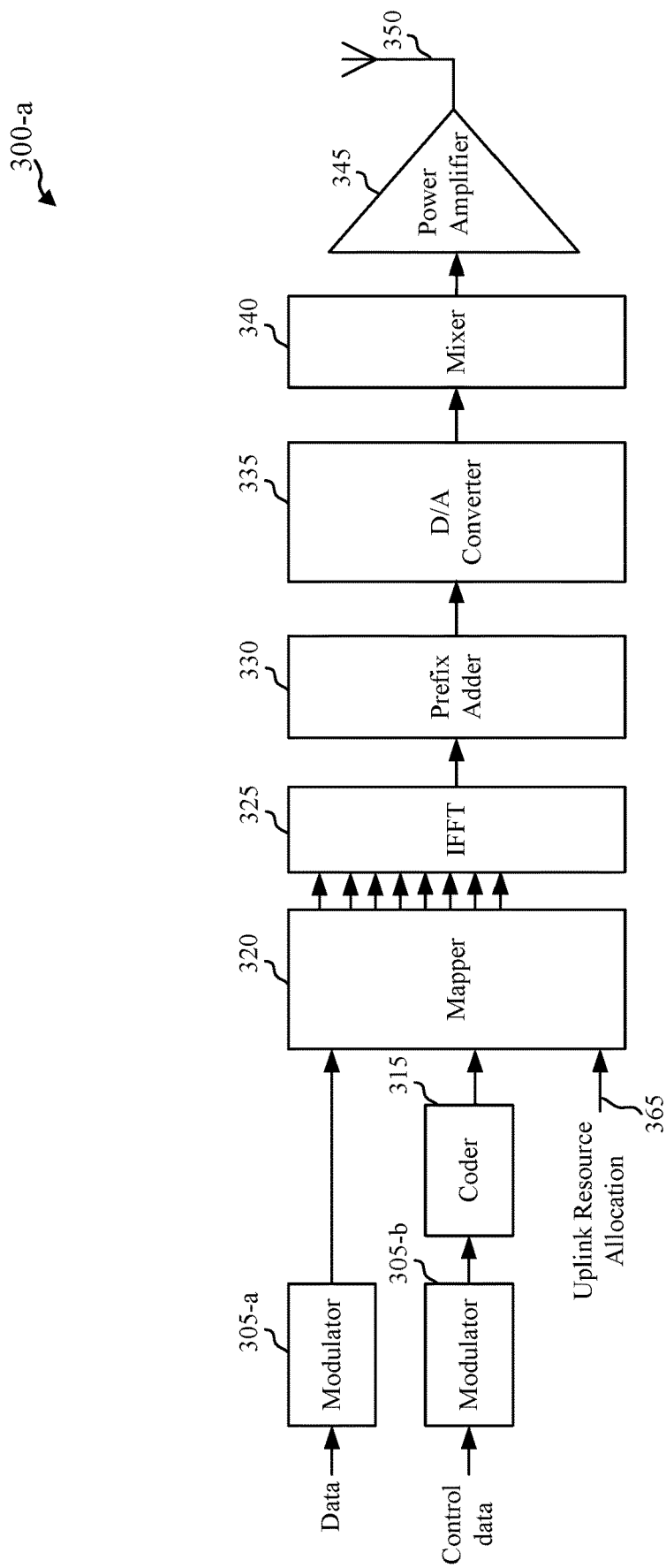
FIGS. 3A-C illustrate example transmitters for data channel-referenced resource allocation for a control channel in accordance with one or more aspects of the present disclosure.
Figure 3B:
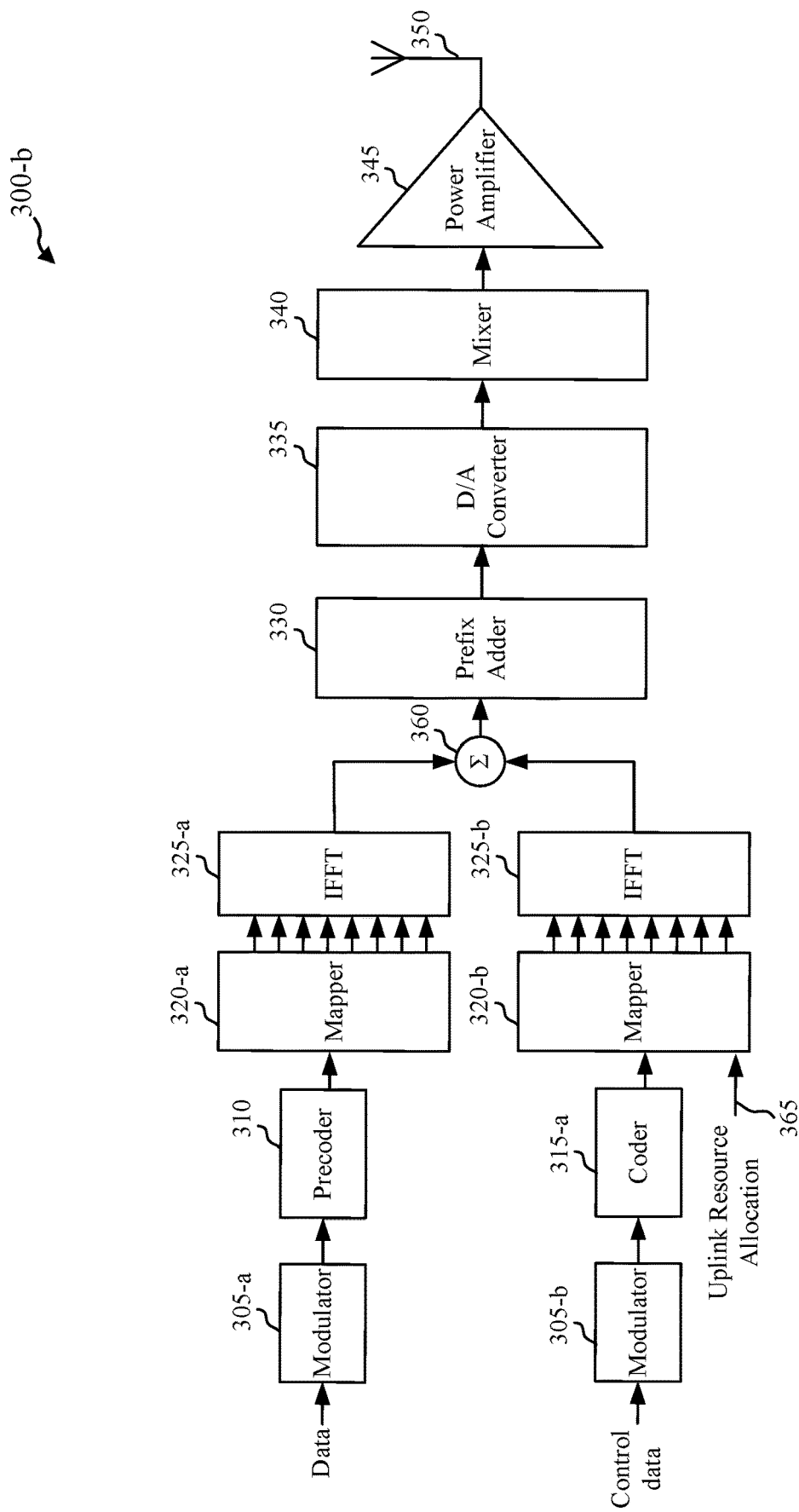
Figure 3C:
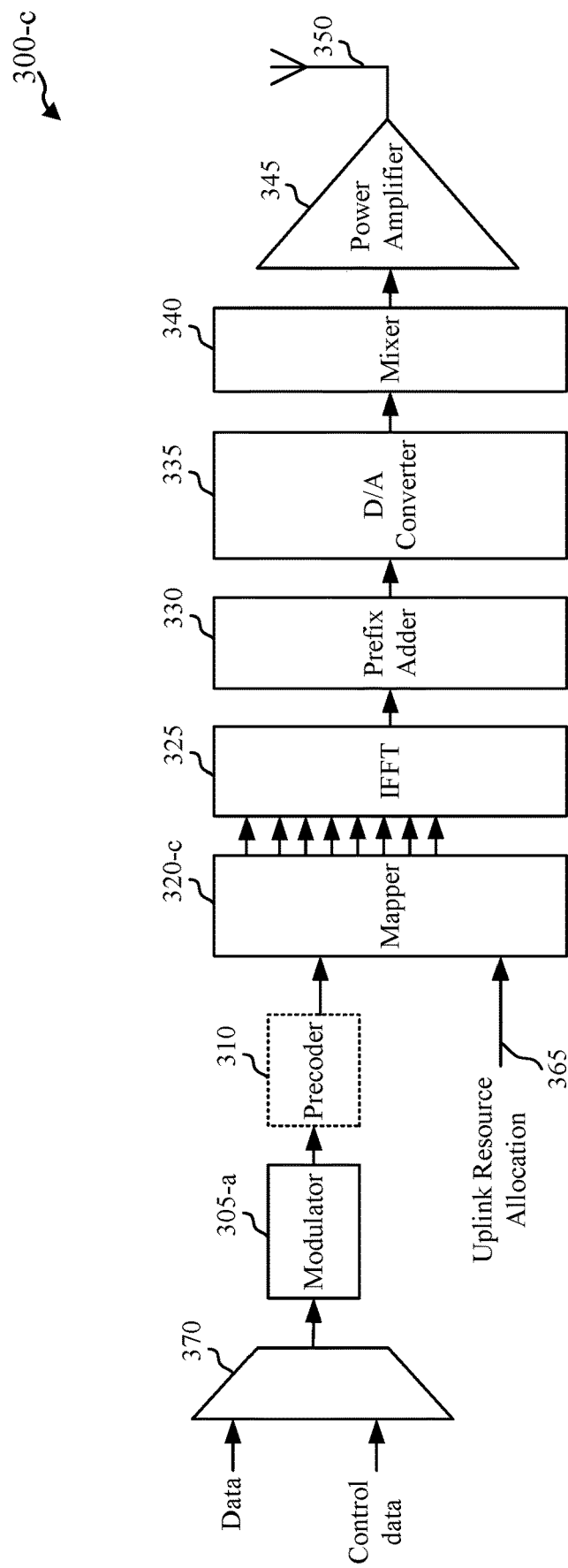

A transmitter of a UE 115 may have different components to enable generation of the different waveforms. FIGS. 3A-3C depict examples of different transmitter arrangements for transmitting a control channel and a data channel that depends on the type of waveform being generated. In FIG. 3A, transmitter 300-*a* may generate a DFT-S-OFDM waveform for PUCCH and a CP-OFDM waveform for PUSCH. In FIG. 3B, transmitter 300-*b* may generate DFT-S-OFDM waveforms for PUCCH and PUSCH. In FIG. 3C, transmitter 300-*c* may generate a DFT-S-OFDM waveform that multiplexes UCI on PUSCH. Additional aspects of each transmitter are described below. A UE 115 may implement one or more of transmitters 300-*a*, 300-*b*, and 300-*c*.

FIG. 3A illustrates an example of a transmitter 300-*a* of a UE 115 for data channel-referenced resource allocation for a control channel in accordance with one or more aspects of the present disclosure. Transmitter 300-*a* may generate a waveform that determines a control channel assignment based at least in part on resources allocated for a data channel. In an example, transmitter 300-*a* may generate a DFT-S-OFDM waveform for PUCCH and a CP-OFDM waveform for PUSCH. A data channel-referenced resource allocation may refer to situating a control channel proximate or adjacent in frequency to a data channel based at least in part on the data channel allocation. It is noted transmitter 300-*a* is one example of a transmitter that may be used by a UE 115, and other transmitters may apply the principles described herein.

In an example, transmitter 300-*a* may identify uplink data for transmitting in a data channel and UCI for transmitting in a control channel. The uplink data and the UCI may be sequences of bits. A modulator 305-*a* may modulate the uplink data bits into data symbols using a modulation technique such as, for example, phase shift keying (PSK), quadrature PSK (QPSK), 16 QAM, and the like. The modulator 305-*a* may output the data symbols to a mapper 320 for mapping onto resource elements.

A modulator 305-*b* may similarly modulate uplink control data bits into control data symbols using a modulation technique such as, for example, PSK, QPSK, 16 QAM, and the like. The modulator 305-*b* may output the control data symbols to a coder 315 for coding. The coder 315 may perform baseband processing on the control data symbols. The coder 315 may be a frequency spreader that produces spread control symbols that are a frequency domain representation of the input control data symbols for generation of a DFT-S-OFDM waveform. The frequency spreader may be a DFT-spreading block or sequence multiplier block. The DFT-spreading block may apply a DFT operation to the control symbols to generate spread control symbols. The sequence multiplier block may multiply the input control data symbols by a sequence having certain frequency characteristics to generate spread control symbols. The sequence may be a cell-specific base sequence that is a function of a physical layer cell identity (PCI). The coder 315 may apply a series of time domain cyclic shifts to the cell-specific control data sequence to randomize intercell interference. In some examples, the UE 115 may determine whether to use the DFT-spreading block or the sequence multiplier block based at least in part on the number of control data symbols, with the DFT-spreading block being used when the number satisfies a threshold (e.g., exceeds a defined number of symbols). The data symbols and the spread control symbols may be fed into a mapper 320 for mapping.

The mapper 320 may map the data symbols and the spread control symbols onto resource elements within a resource grid by selecting which subcarriers of a carrier are to transport the symbols. In one example, the mapper 320 may map the data symbols to the data channel separately from mapping of the spread control symbols (e.g., symbols containing uplink control information) to the control channel. In an example, the mapper 320 selects where to map the data symbols onto resource elements of a data channel and the spread control symbols onto resource elements of a control channel, such that the control channel is adjacent in frequency to the data channel. The separate mapping may refer to mapping the spread control symbols such that they are placed in a control channel that is adjacent in frequency to where the data symbols are mapped to the data channel. In determining where to map the data symbols, the mapper 320 processes an uplink resource allocation 365 received from the base station 105 indicating which resource blocks, and corresponding subcarriers of a carrier, within the resource grid are allocated to the UE 115 for the data channel. In determining where to map the spread control symbols, the mapper 320 may select at least a portion of a resource block (e.g., one or more corresponding subcarriers) of the resource grid for a control channel that is adjacent in frequency to the resource blocks allocated to the data channel. When mapping UCI, for example, the mapper 320 may perform the mapping in accordance with a UCI format and, in some examples, may map a portion of the spread control symbols to each of the data and control channels. Mapping of the data symbols and the spread control symbols to a resource grid is further described below with reference to FIGS. 4-5.

After mapping of the data symbols and the spread control symbols to resource elements of the resource grid, an inverse fast Fourier transform (IFFT) component 325 performs an IFFT (or, equivalently, an inverse discrete Fourier Transform (IDFT)) to compute in-phase and quadrature components of a corresponding time-domain waveform. A prefix adder 330 then adds a cyclic prefix (CP) to the in-phase and quadrature components. The CP may be a set of samples which are duplicated from the end of a transmitted symbol and appended cyclically to the beginning of the symbol. A digital to analog converter 335 converts the output of the prefix adder 330 to an analog signal and a mixer 340 modulates the analog signal to a radio frequency of a carrier. A power amplifier 345 amplifies the RF analog signal for transmission by antenna 350. As a result, transmitter 300-a may generate a DFT-S-OFDM waveform for PUCCH and a CP-OFDM waveform for PUSCH for transmission concurrently in a given TTI.

In other examples, DFT-S-OFDM waveforms may be generated for both PUCCH and PUSCH. FIG. 3B illustrates an example of a transmitter 300-b of a UE 115 for data channel-referenced resource allocation for a control channel in accordance with one or more aspects of the present disclosure. Transmitter 300-b may generate a waveform that determines a control channel assignment based at least in part on resources allocated for a data channel. In an example, transmitter 300-b may generate DFT-S-OFDM waveforms for both PUCCH and PUSCH. The components of transmitter 300-b having the same name as components of transmitter 300-a may perform the same or similar operations. In this example, data may be modulated by modulator 305-a and fed into a precoder 310 for precoding. In an example, the precoder 310 may perform a Discrete Fourier Transform (DFT) on the data symbols to generate precoded symbols by converting the data symbols into a frequency domain representation. The precoding may be used to enable the transmitter 300-b to generate a DFT-S-OFDM waveform, instead of a CP-OFDM waveform described in FIG. 3A, for the PUSCH. The precoded data symbols may be fed into mapper 320-a for mapping onto resource elements within a resource grid. After mapping of the data symbols to resource elements of the resource grid, an IFFT component 325-a performs an inverse fast Fourier transform to compute in-phase and quadrature components of a corresponding time-domain waveform.

Transmitter 300-b may modulate, code, and map control data, as described above in FIG. 3A. Mapper 320-b may receive the uplink resource allocation 365 as an input for determining a data channel-referenced resource allocation for a control channel. IFFT component 325-b may use the mapping to perform an inverse fast Fourier transform that computes in-phase and quadrature components of a corresponding time-domain waveform. The outputs of IFFT components 325-a and 325-b may be added together by a summer 360. The output of summer 360 may be fed to prefix adder 330 and transmitter 300-b may perform operations at components 330, 335, 340, and 345 similar to the description provided above. As a result, the transmitter 300-b may generate DFT-S-OFDM waveforms for each of PUCCH and PUSCH for transmission concurrently in a given TTI.

In other examples, a DFT-S-OFDM waveform may be generated that multiplexes UCI on PUSCH. FIG. 3C illustrates an example of a transmitter 300-c of a UE 115 for data channel-referenced resource allocation for a control channel in accordance with one or more aspects of the present disclosure. Transmitter 300-c may generate a waveform that multiplexes UCI on PUSCH for transmission in a given TTI. In an example, transmitter 300-c may generate a DFT-S-OFDM waveform that multiplexes UCI on PUSCH. Control data (e.g., UCI) and data may be fed into a multiplexor 370 to form multiplexed data that is fed into modulator 305-a. The control data may be a set of symbols having control information (e.g., UCI) spread into a spread control sequence. The multiplexed data may then be modulated by modulator 305-a and precoded by precoder 310, in the same or similar manner as described above in FIG. 3B. The mapper 320-c may map the multiplexed data (e.g., multiplexed symbols for data and symbols for control data) onto resource blocks within a resource grid to piggyback a control channel on a data channel. Transmitter 300-c may perform operations at components 320-c, 325, 330, 335, 340, and 345 similar to the description provided above. As a result, the transmitter 300-c may generate and output a DFT-S-OFDM waveform that multiplexes UCI on PUSCH for transmission in a given TTI. In another example, the precoder 310, shown in FIG. 3C having a dashed line border, may be omitted, resulting in transmitter 300-c generating a CP-OFDM waveform that multiplexes UCI on PUSCH for transmission in a given TTI.

Figure 4:
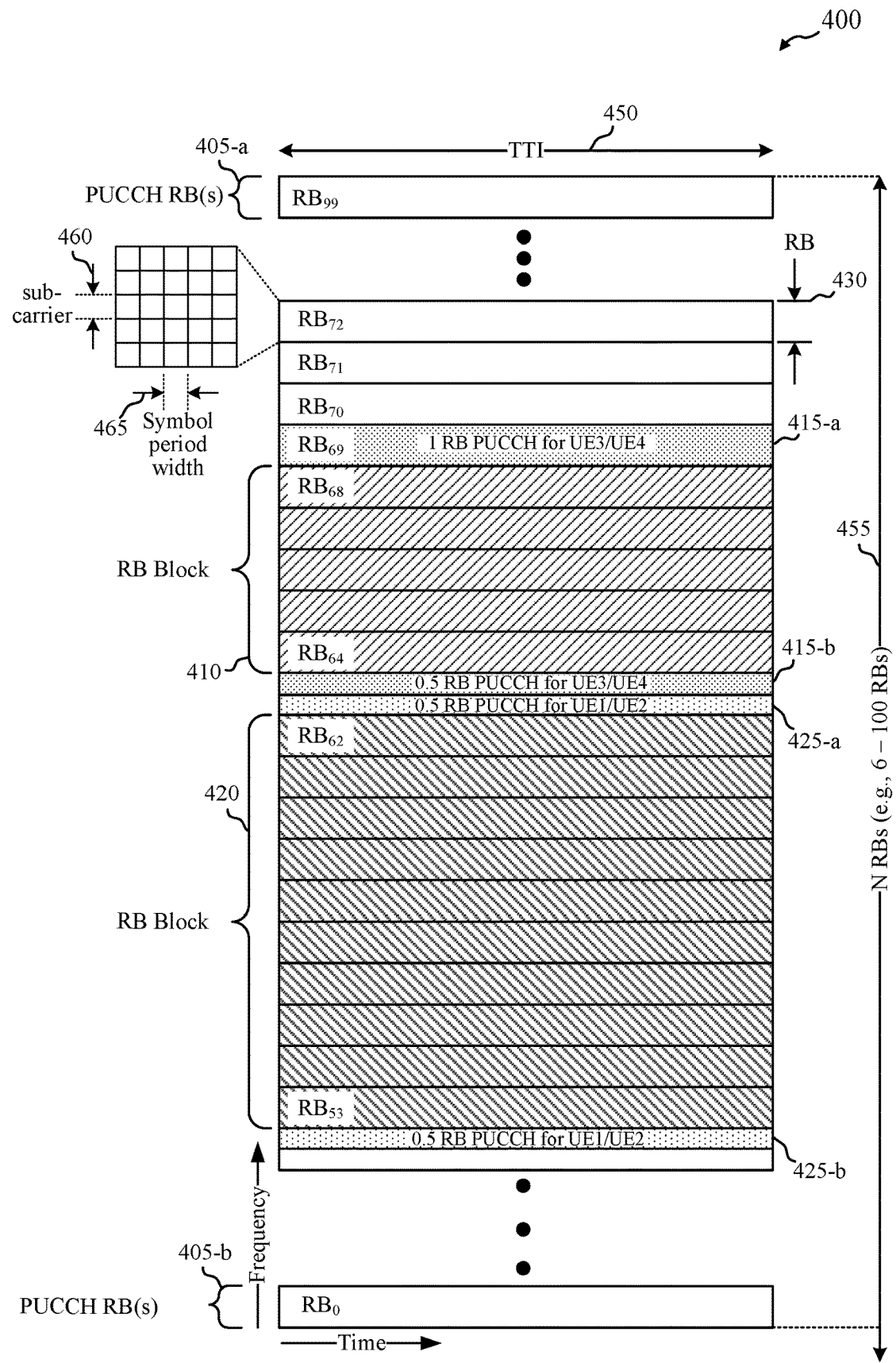
FIG. 4 illustrates an example of a resource grid for data channel-referenced resource allocation for a control channel in accordance with one or more aspects of the present disclosure.

FIG. 4 illustrates an example of a resource grid 400 for data channel-referenced resource allocation for a control channel in accordance with one or more aspects of the present disclosure. Resource grid 400 may identify time and frequency resources that can be allocated to one or more UEs 115 for uplink transmission. Time is depicted from left to right, and frequency is depicted from top to bottom. The time dimension of the resource grid 400 corresponds to a TTI 450. A duration of the TTI 450 may be a defined duration (e.g., 1 millisecond (ms), 2 ms, 10 ms, etc.). The frequency dimension of the resource grid 400 corresponds to a defined frequency range 455 for a carrier that may be allocated to one or more UEs 115 for uplink transmission. The defined frequency range 455 may be equally divided into a defined number N of resource blocks (RBs). Each RB may correspond to a defined number of symbol periods and a defined number of subcarriers of the carrier. A resource element (RE) corresponds to one subcarrier 460 for one symbol period width 465 and may carry one modulated symbol per layer. Each subcarrier 460 may be a radio frequency used for symbol modulation and may be spaced apart from one another in frequency by a fixed amount. An RB may be the smallest set of time-frequency resources that can be allocated to a UE. In an example, resource grid 400 may include N RBs, where N ranges, for example, from 6 to 100. A bandwidth 430 of an RB may be determined by the number of subcarriers of the RB and the subcarrier spacing, which may vary between TTIs as described above.

A base station 105 may determine which RBs, and corresponding REs and subcarriers of a carrier, within the resource grid 400 to allocate to one or more UEs 115 for carrying a data channel. To do so, the base station 105 may send uplink resource allocations (e.g., uplink grants) to the UEs 115 in downlink control information (DCI) identifying which RBs of resource grid 400 have been allocated to which UE 115. For example, the uplink resource allocations may indicate which RBs and/or subcarriers (e.g., a number of subcarriers) have been allocated to a particular UE 115 to transport a data channel, a control channel, or both. The mappers 320 of FIGS. 3A-3C may process the uplink resource allocation to determine a data channel-referenced resource allocation for a control channel. To do so, the mappers 320 may determine which RBs have been allocated to the data channel, and then map control symbols into the RBs adjacent to the RBs allocated to the data channel.

In an example, resource grid 400 may include 100 RBs starting with $RB_0$ on the bottom and increasing sequentially up to $RB_{99}$. The uplink resource allocation may allocate RB blocks having the same or differing granularities, and spatial multiplexing techniques, such as multi-user multiple input multiple output (MU-MIMO), may be used to multiplex layers of control and/or data transmissions over common resources. For example, the base station 105 may allocate a first RB block 410 including $RB_{64}$ to $RB_{68}$ to UE3 and UE4 for transporting respective data channels (e.g., in an MU-MIMO mode), and a second RB block 420 including $RB_{53}$ to $RB_{62}$ to UE1 and UE2 for transporting respective data channels (e.g., in a MU-MIMO mode). In an example, each of the data channels transmitted by each UE is a physical uplink shared channel (PUSCH) and RBs of each RB block 410, 420 are contiguous in frequency.

Based at least in part on its uplink resource allocation, the mapper 320 may identify at least a portion of an RB to transport a control channel adjacent in frequency to a RB block allocated to the UE for its data channel. Placing a control channel proximate or adjacent to RBs allocated to a data channel may be referred to as a data channel-referenced resource allocation for a control channel or piggybacking the control channel on the data channel. In the depicted example, the mapper 320 piggybacks a control channel by mapping control data symbols to RBs outside of, and adjacent to, the RB block the base station 105 specified in the uplink resource allocation.

An RB may be considered adjacent in frequency if the RB is immediately next to an uppermost or lowermost RB of the contiguous RB block. As noted above, UE3 and UE4 are allocated a first RB block 410 that includes $RB_{64}$ to $RB_{68}$. Each of $RB_{69}$ and $RB_{63}$ may be considered to be adjacent in frequency to the first RB block 410. An RB may also be considered adjacent if the RB is within a defined number of RBs relative to an uppermost or lowermost RB of the contiguous RB block. An RB spaced apart from an RB block by one or more RBs may be permitted and still be considered piggybacked or data channel referenced. In an example, an RB for a control channel may be considered piggybacked if no more than 2 RBs separate it from an RB block used for the data channel. In a more detailed example, $RB_{69}$, $RB_{70}$, and $RB_{71}$ may be considered adjacent to first RB block 410, and $RB_{72}$ may not be considered adjacent. A size of the RB gap may vary but may be less than a threshold number to be considered adjacent and may also depend on whether RBs nearby a RB block have been allocated to other UEs for one or more other data channels.

The location and size of the control channel may vary. In an example, a control channel may be adjacent in frequency to an upper boundary, a lower boundary, or both, of an RB block. For instance, the control channel for UE3 and/or UE4 may be transported by $RB_{69}$ (see 415-a), by $RB_{63}$ (see 415-b), or both. The control channel for UE1 and/or UE2 may be transported by $RB_{63}$ (see 425-a), by $RB_{52}$ (see 425-b), or both. In another example, the control channel for UE3 and/or UE4 may only be transported on one side of the first RB block 410, but not on the other (e.g., transported by $RB_{69}$ and not by $RB_{63}$). In a further example, the control channel for a UE may be a fraction of an RB. For example, control channel 415-b may be half of $RB_{63}$. If, for example, $RB_{63}$ includes 16 subcarriers, 8 of the 16 subcarriers may be allocated to transport control channel 415-b. For instance, the upper half of $RB_{63}$, and the corresponding 8 upper subcarriers nearest in frequency to $RB_{64}$, may transport control channel 415-b. In another example, any 8 of the 16 subcarriers of $RB_{63}$ may be allocated to transport control channel 415-b. As the size of the RBs for the control channels on either side of an RB block may vary, the number of subcarriers may vary based at least in part on the size. In some cases, the mapper 320 may use a control channel on one side of an RB block if less than or equal to a predetermined number of data symbols are to be transmitted. In another example, the uplink resource allocation may inform the mapper 320 of the number of subcarriers to use for the control channel, and on which side(s) of the RB block to place the control channel. In some instances, the uplink resource allocation may specify the frequencies of the subcarriers. In other instances, the mapper 320 may select which subcarriers to use for the control channel, and determine on which side(s) of the RB block to place the control channel.

For UEs that are not allocated RBs to transport a data channel, resource grid 400 may also include one or more RBs at the top or bottom for control channels. For example, $RB_{99}$ 405-a and $RB_0$ 405-b may be reserved for control channels to transport control data of UEs that are not allocated any RBs for a data channel within TTI 450.

As noted above with reference to FIGS. 3A-3C, different waveforms may be used to transport the RBs of the data channel and the RBs of the control channel. If, for example, the transmitter 300-a is used, the RBs within RB block 410 may be transported using a CP-OFDM waveform, and $RB_{69}$ (see 415-a) and $RB_{63}$ (see 415-b) may be transported using a DFT-S-OFDM waveform. If, for example, the transmitter 300-b is used, the RBs within RB block 410 may be transported using a DFT-S-OFDM waveform, and $RB_{69}$ (see 415-a) and $RB_{63}$ (see 415-b) may be transported using a DFT-S-OFDM waveform. If, for example, the transmitter 300-c is used, control data is multiplexed with the data, and hence $RB_{69}$ (see 415-a) and $RB_{63}$ (see 415-b) are not exclusively used by a control channel. In that scenario, the RBs within RB block 410 may be transported using a DFT-S-OFDM waveform to transport both the control data and the data.

In some examples, the type(s) of waveforms used by UE 115 may change semi-statically, or may dynamically vary from TTI to TTI. For example, the base station 105 may semi-statically configure the UE 115 for one or more types of waveforms for the PUSCH and/or PUCCH, or may indicate a waveform type for the PUSCH in the uplink grant. In some examples, the UE may use a DFT-S-OFDM waveform for a piggybacked PUCCH independent of the PUSCH waveform type. Alternatively, the UE may select the waveform type for the PUCCH based on the waveform type for the PUSCH. For example, when the PUSCH is configured for CP-OFDM transmission the UE 115 may not perform spreading of control information in the frequency domain for control symbols, and thus the UE may piggyback a PUCCH on PUSCH using a composite CP-OFDM waveform. Conversely, the UE 115 may use a DFT-S-OFDM waveform for a piggybacked PUCCH when the PUSCH is configured for transmission using a DFT-S-OFDM waveform. In yet other alternatives, the UE 115 may determine to piggyback the PUCCH on PUSCH when the PUSCH is configured for CP-OFDM transmission, and multiplex the control information in the PUSCH codeword when the PUSCH is configured for transmission using a DFT-S-OFDM waveform. In some examples, the UE 115 may dynamically vary the waveforms used for piggybacking the control channel or multiplexing the control data based at least in part on the PUSCH waveform and other factors. For example, the UE 115 may consider an amount of control data and data to be transported, a duration of the TTI, and the like to select which waveform type(s) to use for a particular TTI.

Figure 5A:
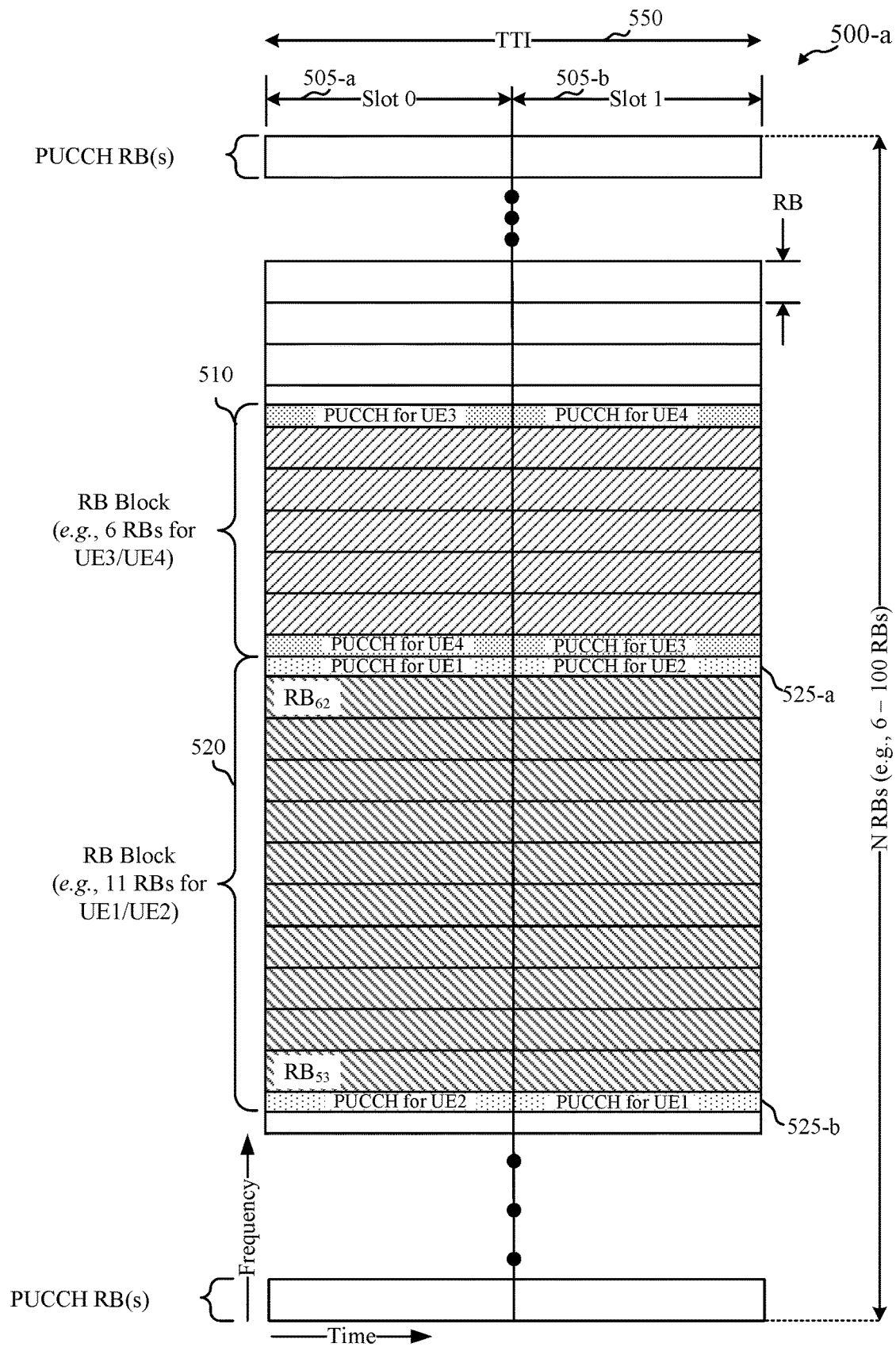
FIGS. 5A-B illustrate examples a resource grid for data channel-referenced resource allocation for a control channel in accordance with one or more aspects of the present disclosure.

In another example, a data channel-referenced resource allocation for a control channel may be provided within an RB block. FIG. 5A illustrates an example of a resource grid 500-*a* for data channel-referenced resource allocation for a control channel in accordance with one or more aspects of the present disclosure. In the depicted example, a TTI 550 may include two or more time slots 505. Depicted are time slots 505-*a*, 505-*b*, but the TTI 550 may include more than two time slots. Similar to the description above, each UE may receive an uplink resource allocation that defines which RBs have been allocated to which UE for uplink transmission.

The uplink resource allocation may differ from that described above as an RB block may identify one or more RBs that a UE is to use for transporting a data channel and a control channel, instead of the uplink resource allocation just identifying an RB block for transport of a data channel as shown in FIG. 4. For example, the uplink resource allocation may allocate at least a portion of RB block 520 to UE1 to transport a control channel and a data channel, and RB block 510 includes 6 RBs for UE3 to transport a control channel and a data channel. The uplink resource allocation may also be sent to UE4, or a separate uplink resource allocation may be transmitted to UE4 to allocate at least a portion of RB block 510 for UE4 to transport both a control channel and a data channel. The uplink resource allocation may include contiguous RBs, or, in some cases, non-contiguous RBs. In some instances, MU-MIMO techniques may be used to enable multiple UEs to share RBs. For example, the uplink resource allocation may be a MU-MIMO uplink (UL) grant of resources that may allocate RBs of an RB block to PUSCH, PUCCH, or both.

In the depicted example, RB block 520 extends from an upper half of $RB_{52}$ (see 525-*b*) through a lower half of $RB_{63}$ (see 525-*a*). In some instances, the time slots of a particular RB or portion thereof may be allocated to different UEs sharing the particular RB. For example, an upper control channel 525-*a* for UE1 and UE2 may correspond to a lower half of $RB_{63}$, and a lower control channel 525-*b* for UE1 and UE2 may correspond to an upper half of $RB_{52}$. UE1 may send control data in control channel 525-*a* during time slot 505-*a* and UE2 may send control data in control channel 525-*a* during time slot 505-*b*. UE1 may send control data in control channel 525-*b* during time slot 505-*b* and UE2 may send control data in control channel 525-*b* during time slot 505-*a*. UE1 and UE2 may achieve frequency diversity by transmitting control data using control channels 525-*a*, 525-*b* corresponding to different frequencies. Similar to the discussion provided above, different transmitters 300-*a* to 300-*c* may generate different waveforms to transport the RBs of the data channel and the RBs of the control channel of RB blocks 510 and 520.

To enable transmission of multiple control and/or data channels from multiple UEs within a TTI 450, a UE 115 may multiplex at least the portion of a resource block by orthogonalizing its control and/or data channel relative to a control and/or data channel of one or more other UEs using a spreading code or a precoding matrix.

The mapper 320 may select a size of an RB to use for a piggybacked control channel. In FIG. 4, for example, upper control channel 415-*a* is a whole RB, whereas lower control channel 415-*b* is half an RB. The number of RBs to use, or fraction thereof, for a control channel may depend on a number of factors. The size of the control channel, in terms of the number of subcarriers (e.g., tones) of a carrier, may be a function of the number of resource blocks in the carrier, the number of symbol periods within a transmission time interval, the number of resource blocks allocated to a UE, and the like. The size of the control channel may be defined, semi-statically configured or indicated/derived. In an example, the number of RBs to use for a control channel may be a function of the number of RBs allocated by the base station 105 to the data channel. In one example, the mapper 320 may allocate a fraction of an RB to a control channel for each RB allocated to a data channel (e.g., allocate 0.5 RB to a control channel per 1 RB allocated to a data channel). In another example, the mapper 320 may allocate RBs based at least in part on the size of a UCI payload. For instance, if a UCI payload meets or falls below a bit threshold (e.g., less than or equal to X bits), the mapper 320 allocates one RB for the control channel. If the UCI payload exceeds the bit threshold (e.g., more than X bits), the mapper 320 allocates two RBs for the control channel.

The mapper 320 may also dynamically or semi-statically enable and disable piggybacking of a control channel. For example, enabling/disabling may be semi-static when RRC configuration controls whether to piggyback a control channel. Dynamic enabling/disabling may be explicit or implicit. For example, the uplink resource allocation may include an explicit indicator specifying to enable/disable piggybacking of a control channel. In another example, enabling/disabling may be implicit and determined using PUSCH parameters and/or UCI parameters. For instance, the mapper 320 may compare a number of data symbols to be sent on PUSCH to a threshold. If the number of symbols is less than or equal to the threshold (e.g., <=N symbols), the mapper 320 enables piggybacking if the UE 115 has UCI to transmit. If the number of symbols exceeds the threshold, the mapper 320 disables piggybacking.

When piggybacking of a control channel is disabled for a particular TTI, the UE 115 may transport UCI using other mechanisms for that TTI. For example, the UE 115 may determine, based at least in part on a number of PUSCH symbols being below a threshold, to multiplex control data with uplink data within the data channel for that TTI, instead of piggy backing a control channel. The mapper 320 may then multiplex control data symbols within the resource blocks allocated by the base station 105 for the data channel. For example, the UE 115 may transport the UCI within the PUSCH channel on a DFT-S-OFDM waveform, instead of sending the UCI on a piggybacked control channel.

Figure 5B:
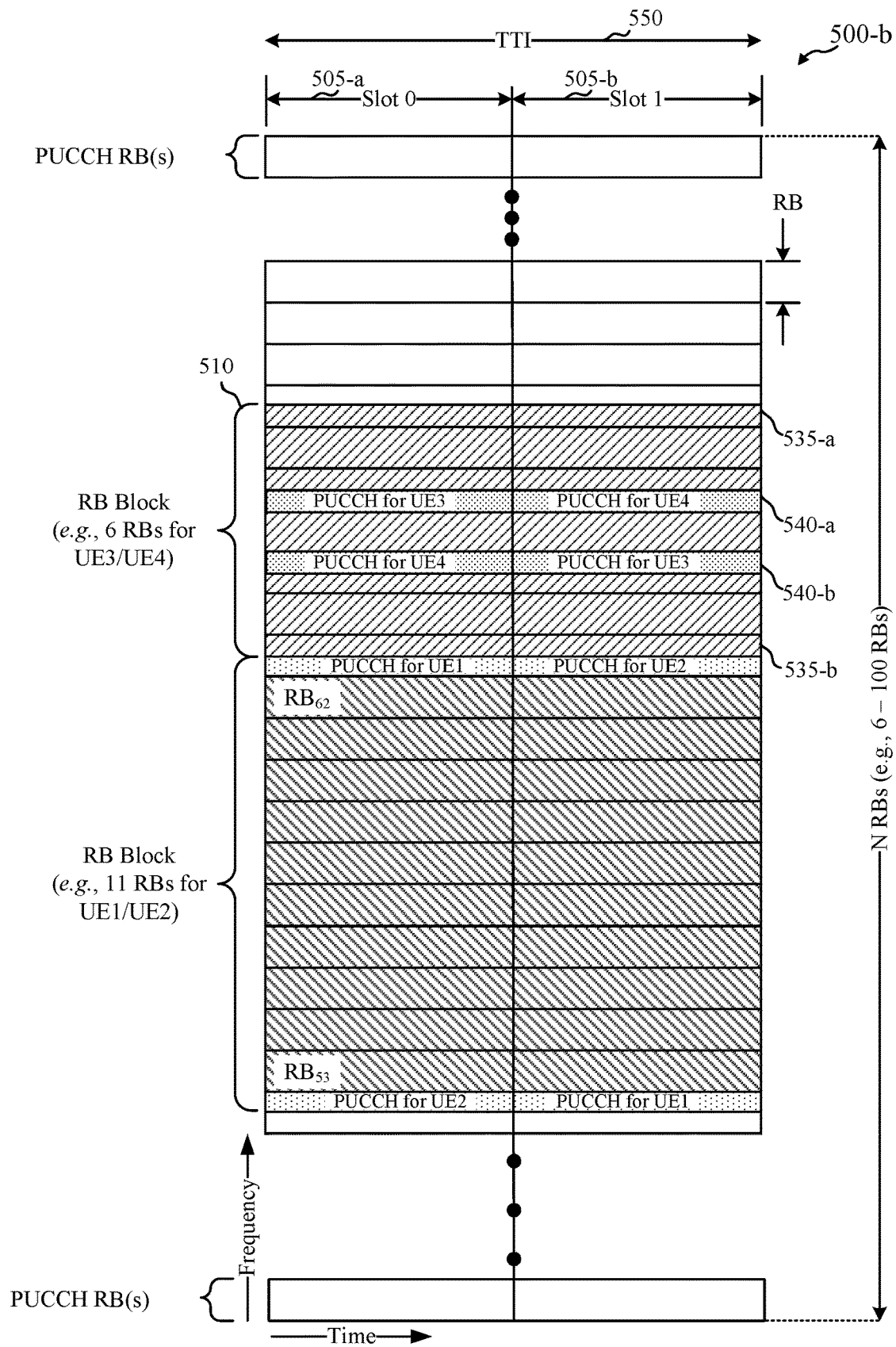

In some examples, the control channel may be interposed within a resource block allocated to a UE. FIG. 5B illustrates an example of a resource grid 500-*b* for data channel-referenced resource allocation for a control channel in accordance with one or more aspects of the present disclosure. Similar to the description above, each UE may receive an uplink resource allocation that defines which RBs have been allocated to which UE for uplink transmission.

The uplink resource allocation may identify one or more RBs that a UE is to use for transporting a data channel having an interposed control channel. For example, the uplink resource allocation may allocate to UE3 at least a portion of RB block 510 that includes 6 RBs for transport of both a control channel and a data channel. The uplink resource allocation may also be sent to UE4, or a separate uplink resource allocation may be transmitted to UE4 to allocate at least a portion of RB block 510 for UE4 to transport both a control channel and a data channel. The uplink resource allocation may include contiguous RBs, or, in some cases, non-contiguous RBs. In some instances, MU-MIMO techniques may be used to enable multiple UEs to share RBs. For example, the uplink resource allocation may be a MU-MIMO uplink (UL) grant of resources that may allocate RBs of an RB block to PUSCH, PUCCH, or both. In the depicted example, RB block 510 extends from a lower half of $RB_{69}$ (see 535-a) through an upper half of $RB_{63}$ (see 535-a). One or more control channels may be interposed within RB block 510. Control channels 540-a and 540-b are depicted interposed within RB block 510. Control channels 540-a and 540-b may be placed at other RBs (or locations) within RB block 510, may be in one or both time slots 505-a, 505-b, and may be placed in adjacent RBs within RB block 510.

The examples described herein may be used in spatial multiplexing techniques such as, for example, single user multiple-input and multiple-output (SU-MIMO) and multi-user MIMO. For SU-MIMO transmissions, a UE 115 may use precoding to send multiple parallel data streams (or layers) via multiple antennas. UE 115 may apply a precoding matrix to precode data of each layer that is being transmitted using the multiple antennas. UE 115 may communicate a precoding matrix indicator (PMI) so that the base station 105 knows which precoding matrix is being used so that a transmitted stream can be decoded. In the examples described herein, one or more layers may be used to transport a data channel and one or more layers may be used to transport a control channel. The UE 115 may determine for the data channel multiple precoding matrices associated with a multiple layers for a TTI. UE 115 may apply the precoding matrices to precode data information for transmission of the first channel over the layers. Additionally, UE 115 may apply one of the multiple precoding matrices to precode control information for transmission of the control channel over one of the layers. Beneficially, precoding of the control channel may assist in channel estimation for the assigned layer. Open loop and/or closed loop antenna selection may also be used.

The examples described herein may be used to time division multiplex (TDM) the control channel and the data channel. In such an example, PUCCH may be time division multiplexed with PUSCH such that PUCCH is time adjacent to and/or interposed within PUSCH within a TTI. In some examples, a demodulation reference signal (DMRS) may be transported within a TTI with the PUCCH being time adjacent to the DMRS. DMRS may be used for channel estimation and for coherent demodulation. In some examples, UE 115, base station 105, or both, may determine whether to use FDM or TDM based at least in part on a duration of the TTI, a size of the first uplink resource allocation of the data channel, a payload size of information carried on the control channel, or combinations thereof. TDM may be selected when the size of the payload size of information carried on the control channel satisfies a threshold for a particular TTI (e.g., exceeds a predetermined size that is a function of the duration of a TTI), when the payload size of information carried on the control channel exceeds the payload size of information carried on the data channel, and the like.

Piggybacking a control channel on a data channel provides a number of benefits. First, due to the piggybacked control channel being adjacent in frequency to a data channel, MPR can be reasonably managed. For example, allocating MPR can be reasonably managed due to continuous resources in frequency being allocated to adjacent PUCCH and PUSCH, even if such an arrangement might not technically qualify as being a single-carrier waveform. Second, by transmitting UCI on a control channel that is separate from a data channel (e.g., on PUCCH and not PUSCH), the task of managing PUSCH rate adaptation is advantageously separate from managing UCI on a control channel. Third, a control channel of a first UE may be multiplexed with a control channel of one or more other UEs. This may be beneficial if the one or more other UEs' PUSCH transmissions are MU-MIMO with the given UE's PUSCH transmission in the same allocated PUSCH resource. Fourth, placing a control channel adjacent to a data channel may reduce intermodulation.

Figure 6:
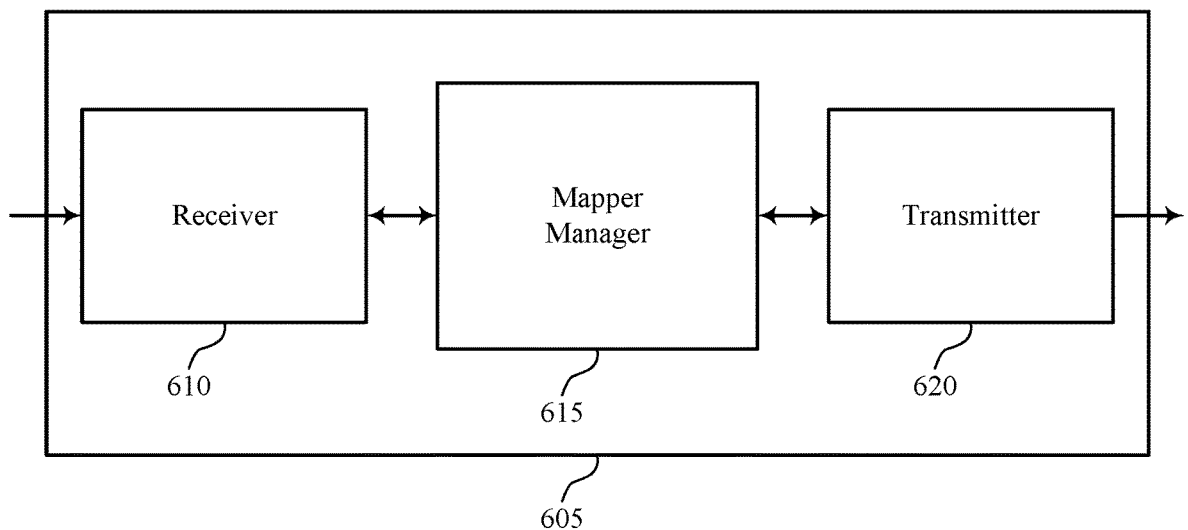
FIGS. 6 through 8 show block diagrams of a device for data channel-referenced resource allocation for a control channel in accordance with one or more aspects of the present disclosure.

FIG. 6 shows a block diagram 600 of a wireless device 605 that supports data channel-referenced resource allocation for a control channel in accordance with various aspects of the present disclosure. Wireless device 605 may be an example of aspects of a user equipment (UE) 115 as described with reference to FIG. 1. Wireless device 605 may include receiver 610, mapper manager 615, and transmitter 620. Wireless device 605 may also include a processor. Each of these components may be in communication with one another (e.g., via one or more buses).

Receiver 610 may receive information such as packets, user data, or control information associated with various information channels (e.g., control channels, data channels, and information related to data channel-referenced resource allocation for a control channel, etc.). Information may be passed on to other components of the device. The receiver 610 may be an example of aspects of the transceiver 935 described with reference to FIG. 9.

Receiver 610 may receive an allocation message indicating a first uplink resource allocation and a number of subcarriers for a second channel.

Mapper manager 615 may include aspects of the mapper manager 915 described with reference to FIG. 9 and/or the mappers 320 of FIGS. 3A-3C.

Mapper manager 615 and/or at least some of its various sub-components may be implemented in hardware, software executed by a processor, firmware, or any combination thereof. If implemented in software executed by a processor, the functions of the mapper manager 615 and/or at least some of its various sub-components may be executed by a general-purpose processor, a digital signal processor (DSP), an application-specific integrated circuit (ASIC), an field-programmable gate array (FPGA) or other programmable logic device, discrete gate or transistor logic, discrete hardware components, or any combination thereof designed to perform the functions described in the present disclosure. The mapper manager 615 and/or at least some of its various sub-components may be physically located at various positions, including being distributed such that portions of functions are implemented at different physical locations by one or more physical devices. In some examples, mapper manager 615 and/or at least some of its various sub-components may be a separate and distinct component in accordance with various aspects of the present disclosure. In other examples, mapper manager 615 and/or at least some of its various sub-components may be combined with one or more other hardware components, including but not limited to an I/O component, a transceiver, a network server, another computing device, one or more other components described in the present disclosure, or a combination thereof in accordance with various aspects of the present disclosure.

Mapper manager 615 may identify, for a TTI, a first uplink resource allocation to a UE of a first channel and determine, based on the first uplink resource allocation of the first channel, a second uplink resource allocation of a second channel to the UE. Mapper manager 615 may also identify, for a TTI, an uplink resource allocation to the UE of a physical shared channel for a first transmission channel, the uplink resource allocation including a set of resource blocks, each of the set of resource blocks including a set of subcarriers of a carrier, determine, based at least in part on the uplink resource allocation, at least a portion of a resource block of a physical shared channel for carrying a second transmission channel, the at least the portion of the resource block being adjacent to the first transmission channel, and transmit, during the transmission time interval, information of a first type mapped to the first transmission channel and information of a second type mapped to the second transmission channel.

Transmitter 620 may transmit signals generated by other components of the device. In some examples, the transmitter 620 may be collocated with a receiver 610 in a transceiver module. For example, the transmitter 620 may be an example of aspects of the transceiver 935 described with reference to FIG. 9. The transmitter 620 may include a single antenna, or it may include a set of antennas. In some cases, transmitter 620 may transmit, during a TTI, the first channel and the second channel. In some cases, transmitting, during the TTI, the first channel and the second channel includes time-division multiplexing the first channel with the second channel during the TTI. In some cases, transmitter 620 may determine to time-division multiplex the first channel with the second channel based at least in part on a duration of the TTI, a size of the first uplink resource allocation of the first channel, a payload size of information carried on the second channel, or combinations thereof. Transmitter 620 may also transmit, during a second TTI, multiplexed data and control information in the first channel using a DFT-S-OFDM waveform or a CP-OFDM waveform.

Figure 7:
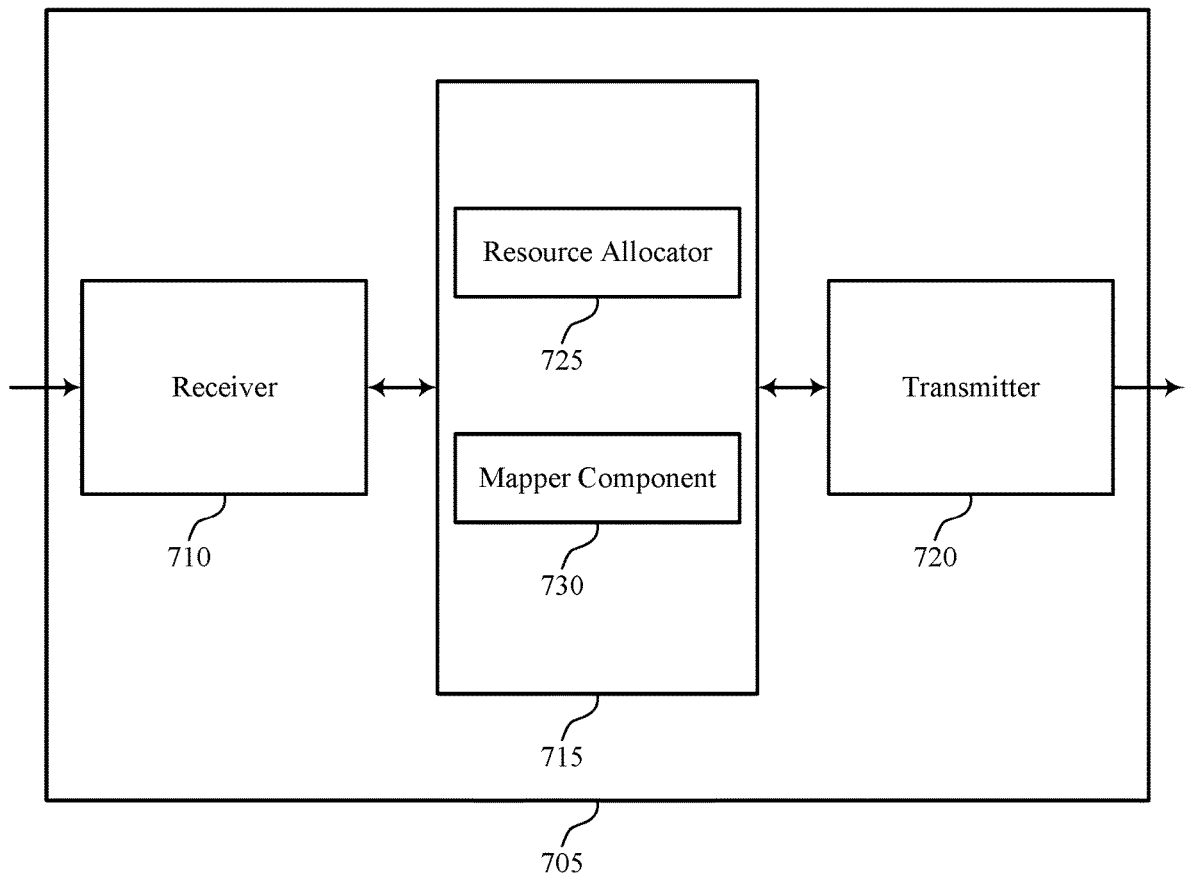

FIG. 7 shows a block diagram 700 of a wireless device 705 that supports data channel-referenced resource allocation for a control channel in accordance with various aspects of the present disclosure. Wireless device 705 may be an example of aspects of a wireless device 605 or a UE 115 as described with reference to FIGS. 1 and 6. Wireless device 705 may include receiver 710, mapper manager 715, and transmitter 720. Wireless device 705 may also include a processor. Each of these components may be in communication with one another (e.g., via one or more buses).

Receiver 710 may receive information such as packets, user data, or control information associated with various information channels (e.g., control channels, data channels, and information related to data channel-referenced resource allocation for a control channel, etc.). Information may be passed on to other components of the device. The receiver 710 may be an example of aspects of the transceiver 935 described with reference to FIG. 9.

Mapper manager 715 may include aspects of the mapper manager 915 described with reference to FIG. 9 and/or the mappers 320 of FIGS. 3A-3C. Mapper manager 715 may also include Resource Allocator 725 and Mapper Component 730. Mapper Component 730 may be an example of a mapper 320 described with reference to FIGS. 3A-3C.

Resource Allocator 725 may identify, for a transmission time interval, an uplink resource allocation to a UE of a physical shared channel for a first transmission channel, the uplink resource allocation including a set of resource blocks, each of the set of resource blocks including a set of subcarriers of a carrier. Resource Allocator 725 may identify, for a second transmission time interval, a second uplink resource allocation to the UE of the physical shared channel for the first transmission channel. Resource Allocator 725 may determine, based at least in part on the uplink resource allocation, to multiplex information of the second type with information of the first type for the second transmission time interval, and receive an allocation message indicating the uplink resource allocation and a number of subcarriers for the second transmission channel.

Resource Allocator 725 may identify, for a TTI, a first uplink resource allocation to a UE of a first channel and may determine, based on the first uplink resource allocation of the first channel, a second uplink resource allocation of a second channel to the UE. In some cases, the determining of the second uplink resource allocation includes locating the second channel in a frequency resource adjacent to at least one of a lower boundary or an upper boundary of the first uplink resource allocation. In some cases, the determining of the second uplink resource allocation includes locating the second channel in a frequency resource interposed within the first uplink resource allocation. Resource Allocator 725 may pass the first and second uplink resource allocations to the Mapper Component 730.

In some cases, Resource Allocator 725 may determine, based at least in part on the uplink resource allocation, at least a portion of a resource block of the physical shared channel for carrying a second transmission channel, the at least the portion of the resource block being adjacent to the first transmission channel. In some cases, the determining the at least the portion of the resource block includes determining the at least the portion of the resource block based at least in part on the number of the set of resource blocks allocated by the uplink resource allocation. In some cases, the determining the at least the portion of the resource block includes determining the at least the portion of the resource block based at least in part on a size of a payload of the information of the second type. In some cases, the determining the at least the portion of the resource block includes determining a number of subcarriers in the at least the portion of the resource block based at least in part on a number of symbol periods in the transmission time interval, a number of the set of resource blocks, a number of resource blocks in the carrier, or a combination thereof. Resource Allocator 725 may pass the at least the portion of a resource block of the physical shared channel for carrying a second transmission channel to the Mapper Component 730.

Mapper Component 730 may receive uplink resource allocation information including, for example, the uplink resource allocation to the UE of a physical shared channel for a first transmission channel and the at least the portion of a resource block of the physical shared channel for carrying a second transmission channel. Referring back to FIGS. 3A-3C, for example, the uplink resource allocation 365 may correspond to the uplink resource allocation information received by Mapper Component 730. Mapper Component 730 may transmit, during the transmission time interval, information of a first type mapped to the first transmission channel and information of a second type mapped to the second transmission channel.

Transmitter 720 may transmit signals generated by other components of the device. In some examples, the transmitter 720 may be collocated with a receiver 710 in a transceiver module. For example, the transmitter 720 may be an example of aspects of the transceiver 935 described with reference to FIG. 9. The transmitter 720 may include a single antenna, or it may include a set of antennas.

In some cases, transmitter 720 may generate a discrete Fourier transform spread orthogonal frequency division multiplexing (DFT-S-OFDM) waveform for the first channel and generate a DFT-S-OFDM waveform for the second channel. In some cases, the transmitting, during the TTI, the first channel and the second channel includes generating a cyclic prefix orthogonal frequency division multiplexing (CP-OFDM) waveform for the first channel. In some cases, the transmitting, during the TTI, the first channel and the second channel includes generating a DFT-S-OFDM waveform for the first channel. In some cases, the transmitting, during the TTI, the first channel and the second channel includes generating a CP-OFDM waveform for the first channel and generating a DFT-S-OFDM waveform for the second channel.

Figure 8:
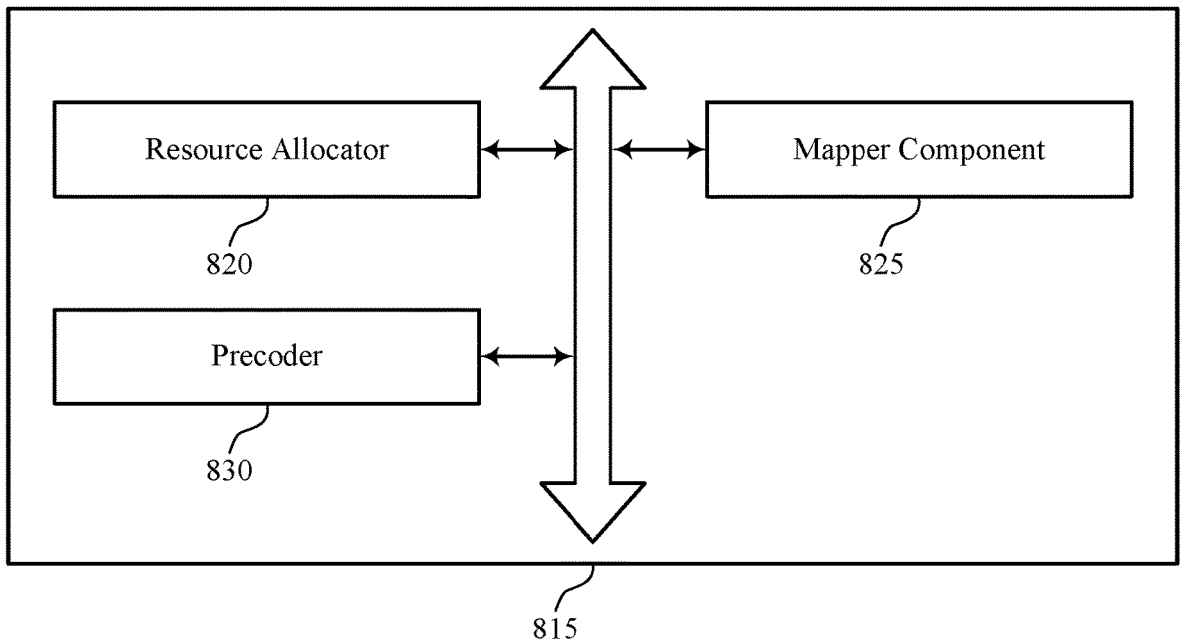

In some cases, transmitter 720 may determine that the UE is to use a DFT-S-OFDM waveform or a CP-OFDM waveform during a second TTI and determine to multiplex data information with control information into the first channel for the second TTI. In some cases, the transmitter 720 may transmit, during the second TTI, the multiplexed data and control information in the first channel using the DFT-S-OFDM waveform or the CP-OFDM waveform FIG. 8 shows a block diagram 800 of a mapper manager 815 that supports data channel-referenced resource allocation for a control channel in accordance with various aspects of the present disclosure. The mapper manager 815 may be an example of aspects of a mapper manager 615, a mapper manager 715, or a mapper manager 915 described with reference to FIGS. 6, 7, and 9. The mapper manager 815 may include Resource Allocator 820, Mapper Component 825, and Precoder 830. Precoder 830 may be an example of precoder 310 and Mapper Component 825 may be an example of the mappers 320 of FIGS. 3A-3C. Each of these modules may communicate, directly or indirectly, with one another (e.g., via one or more buses).

Resource Allocator 820 may identify, for a transmission time interval, an uplink resource allocation to a UE of a physical shared channel for a first transmission channel, the uplink resource allocation including a set of resource blocks, each of the set of resource blocks including a set of subcarriers of a carrier. Resource Allocator 820 may identify, for a second transmission time interval, a second uplink resource allocation to the UE of the physical shared channel for the first transmission channel. Resource Allocator 820 may determine, based at least in part on the uplink resource allocation, to multiplex information of the second type with information of the first type for the second transmission time interval, and receive an allocation message indicating the uplink resource allocation and a number of subcarriers for the second transmission channel. In some cases, the information of the first type includes data and the information of the second type includes uplink control information.

In some cases, the first uplink resource allocation has a first granularity and the second uplink resource allocation has a second granularity different from the first granularity. In some cases, the second channel is orthogonalized to a channel for at least one other UE transmitted in at least a portion of the second uplink resource allocation using a spreading code or a precoding matrix. In some cases, the second channel is not adjacent to a lower frequency boundary or an upper frequency boundary of the first uplink resource allocation. In some cases, a size of the second uplink resource allocation of the second channel is determined based on at least one of an indication in a control channel, a size of the first uplink resource allocation of the first channel, a payload size of information carried on the second channel, a location of the first uplink resource allocation of the first channel, a format of the second channel, a duration of the TTI, or a combination thereof.

In some cases, Resource Allocator 820 may identify, for a TTI, a first uplink resource allocation to a UE of a first channel. In some cases, Resource Allocator 820 may determine, based on the first uplink resource allocation of the first channel, a second uplink resource allocation of a second channel to the UE. In some cases, the first channel is a data channel and the second channel is a control channel. In some cases, the first uplink resource allocation of the first channel and the second uplink resource allocation of the second channel are physically contiguous at least during a portion of the TTI. In some cases, the determining of the second uplink resource allocation includes locating the second channel in a frequency resource adjacent to at least one of a lower boundary or an upper boundary of the first uplink resource allocation. In some cases, the determining of the second uplink resource allocation includes locating the second channel in a frequency resource interposed within the first uplink resource allocation. Resource Allocator 820 may pass the first and second uplink resource allocations to the Mapper Component 825.

In some cases, Resource Allocator 820 may determine, based at least in part on the uplink resource allocation, at least a portion of a resource block of the physical shared channel for carrying a second transmission channel, the at least the portion of the resource block being adjacent to the first transmission channel. In some cases, the determining the at least the portion of the resource block includes determining the at least the portion of the resource block based at least in part on the number of the set of resource blocks allocated by the uplink resource allocation. In some cases, the determining the at least the portion of the resource block includes determining the at least the portion of the resource block based at least in part on a size of a payload of the information of the second type.

In some cases, the determining the at least the portion of the resource block includes determining a number of subcarriers in the at least the portion of the resource block based at least in part on a number of symbol periods in the transmission time interval, a number of the set of resource blocks, a number of resource blocks in the carrier, or a combination thereof. In some cases, the at least the portion of the resource block includes a first portion of a first resource block adjacent to a lower boundary of the first transmission channel and a second portion of a second resource block adjacent to an upper boundary of the first transmission channel. In some cases, the at least the portion of the resource block includes frequency resources adjacent to one of a lower boundary or an upper boundary of the first transmission channel. In some cases, the at least the portion of the resource block includes a portion of the set of resource blocks of the uplink resource allocation. In some cases, the at least the portion of the resource block includes frequency resources adjacent to the set of resource blocks of the uplink resource allocation. In some cases, a number of subcarriers in the first portion of the first resource block differs from a number of subcarriers in the second portion of the second resource block. Resource Allocator 820 may pass the at least the portion of the resource block for carrying a second transmission channel to the or Mapper Component 825.

Mapper Component 825 may receive, from the Resource Allocator 820, uplink resource allocation information including, for example, the uplink resource allocation to the UE of a physical shared channel for a first transmission channel and the at least the portion of a resource block of the physical shared channel for carrying a second transmission channel. Referring back to FIGS. 3A-3C, for example, the uplink resource allocation 365 may correspond to the uplink resource allocation information received by Mapper Component 825.

Mapper Component 825 transmit, during the transmission time interval, information of a first type mapped to the first transmission channel and information of a second type mapped to the second transmission channel. In some cases, the transmitting, during the TTI, the first channel and the second channel includes generating a CP-OFDM waveform for the first channel and generating a DFT-S-OFDM waveform for the second channel. In some cases, Mapper Component 825 may map a first portion of uplink control information to the first channel and map a second portion of the uplink control information to the second channel. In some cases, information of a first type is mapped to the first channel and information of a second type is mapped to the second channel.

In some cases, Mapper Component 825 may map the uplink control information to the second transmission channel according to at least a portion of an uplink control channel format, map the DFT-precoded data symbols to the first transmission channel separately from mapping of the uplink control information to the second transmission channel, and transmit, during the second transmission time interval, the multiplexed information mapped to the first transmission channel. In some cases, the second channel is mapped to a first frequency location for a first portion of the TTI and a second frequency location for a second portion of the TTI.

Precoder 830 may perform DFT precoding on the data to obtain DFT-precoded data symbols for input to the Mapper Component 825. In some cases, Precoder 830 may determine, for the first channel, a set of precoding matrices associated with a set of layers for the TTI. Precoder 830 may apply the set of precoding matrices to precode information of a first type for transmission of the first channel over a set of layers and apply one of the set of precoding matrices to precode information of a second type for transmission of the second channel over one of the set of layers.

Figure 9:
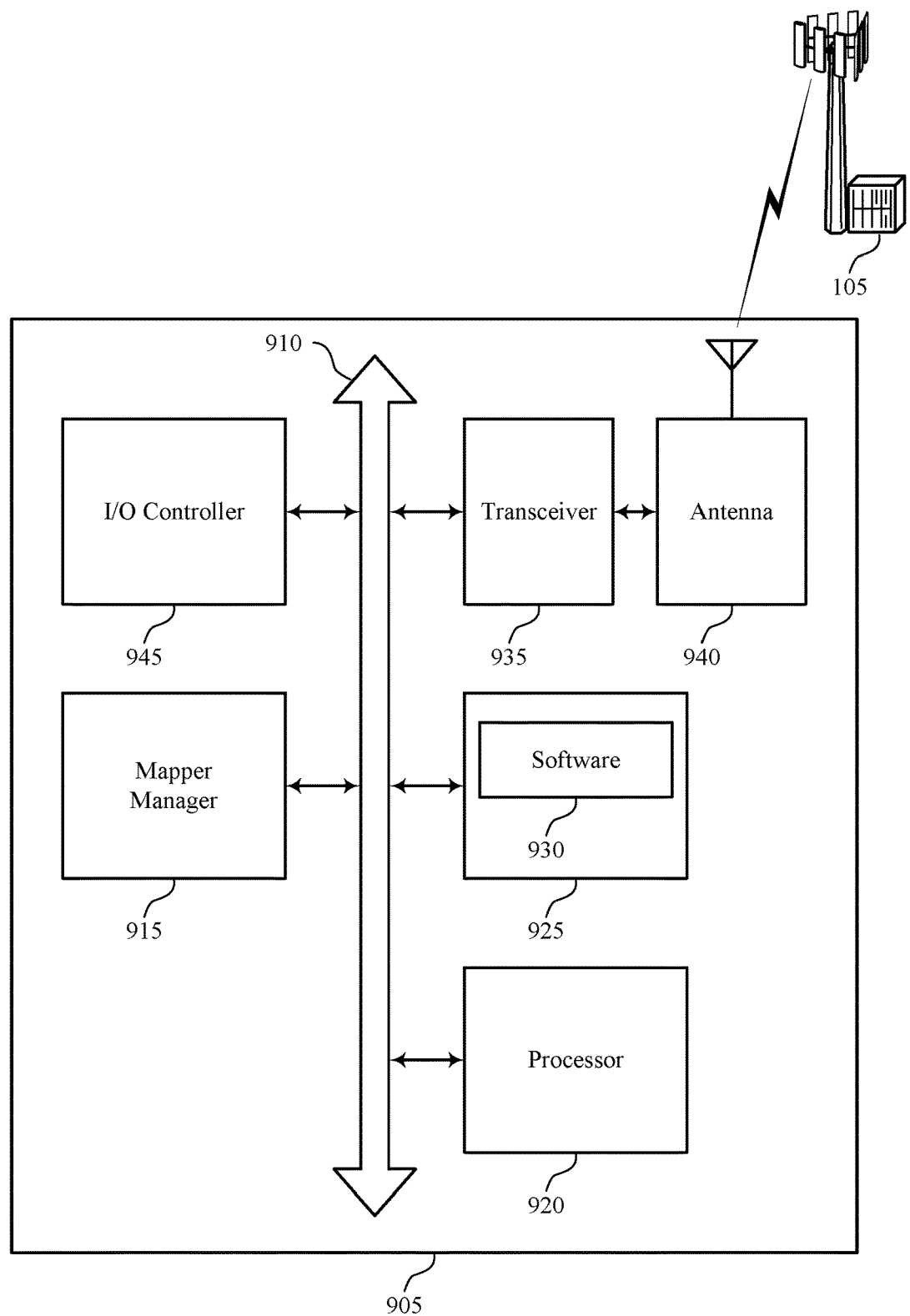
FIG. 9 illustrates a block diagram of a system including a UE for data channel-referenced resource allocation for a control channel in accordance with one or more aspects of the present disclosure.

FIG. 9 shows a diagram of a system 900 including a device 905 that supports data channel-referenced resource allocation for a control channel in accordance with various aspects of the present disclosure. Device 905 may be an example of or include the components of wireless device 605, wireless device 705, or a UE 115 as described above, e.g., with reference to FIGS. 1, 6 and 7. Device 905 may include components for bi-directional voice and data communications including components for transmitting and receiving communications, including mapper manager 915, processor 920, memory 925, software 930, transceiver 935, antenna 940, and I/O controller 945. These components may be in electronic communication via one or more busses (e.g., bus 910). Device 905 may communicate wirelessly with one or more base stations 105.

Processor 920 may include an intelligent hardware device, (e.g., a general-purpose processor, a DSP, a central processing unit (CPU), a microcontroller, an ASIC, an FPGA, a programmable logic device, a discrete gate or transistor logic component, a discrete hardware component, or any combination thereof). In some cases, processor 920 may be configured to operate a memory array using a memory controller. In other cases, a memory controller may be integrated into processor 920. Processor 920 may be configured to execute computer-readable instructions stored in a memory to perform various functions (e.g., functions or tasks supporting data channel-referenced resource allocation for a control channel).

Memory 925 may include random access memory (RAM) and read only memory (ROM). The memory 925 may store computer-readable, computer-executable software 930 including instructions that, when executed, cause the processor to perform various functions described herein. In some cases, the memory 925 may contain, among other things, a basic input/output system (BIOS) which may control basic hardware and/or software operation such as the interaction with peripheral components or devices.

Software 930 may include code to implement aspects of the present disclosure, including code to support data channel-referenced resource allocation for a control channel. Software 930 may be stored in a non-transitory computer-readable medium such as system memory or other memory. In some cases, the software 930 may not be directly executable by the processor but may cause a computer (e.g., when compiled and executed) to perform functions described herein.

Transceiver 935 may communicate bi-directionally, via one or more antennas, wired, or wireless links as described above. For example, the transceiver 935 may represent a wireless transceiver and may communicate bi-directionally with another wireless transceiver. The transceiver 935 may also include a modem to modulate the packets and provide the modulated packets to the antennas for transmission, and to demodulate packets received from the antennas.

In some cases, the wireless device may include a single antenna 940. However, in some cases the device may have more than one antenna 940, which may be capable of concurrently transmitting or receiving multiple wireless transmissions.

I/O controller 945 may manage input and output signals for device 905. I/O controller 945 may also manage peripherals not integrated into device 905. In some cases, I/O controller 945 may represent a physical connection or port to an external peripheral. In some cases, I/O controller 945 may utilize an operating system such as iOS®, ANDROID®, MS-DOS®, MS-WINDOWS®, OS/2®, UNIX®, LINUX®, or another known operating system. In other cases, I/O controller 945 may represent or interact with a modem, a keyboard, a mouse, a touchscreen, or a similar device. In some cases, I/O controller 945 may be implemented as part of a processor. In some cases, a user may interact with device 905 via I/O controller 945 or via hardware components controlled by I/O controller 945.

Figure 10:
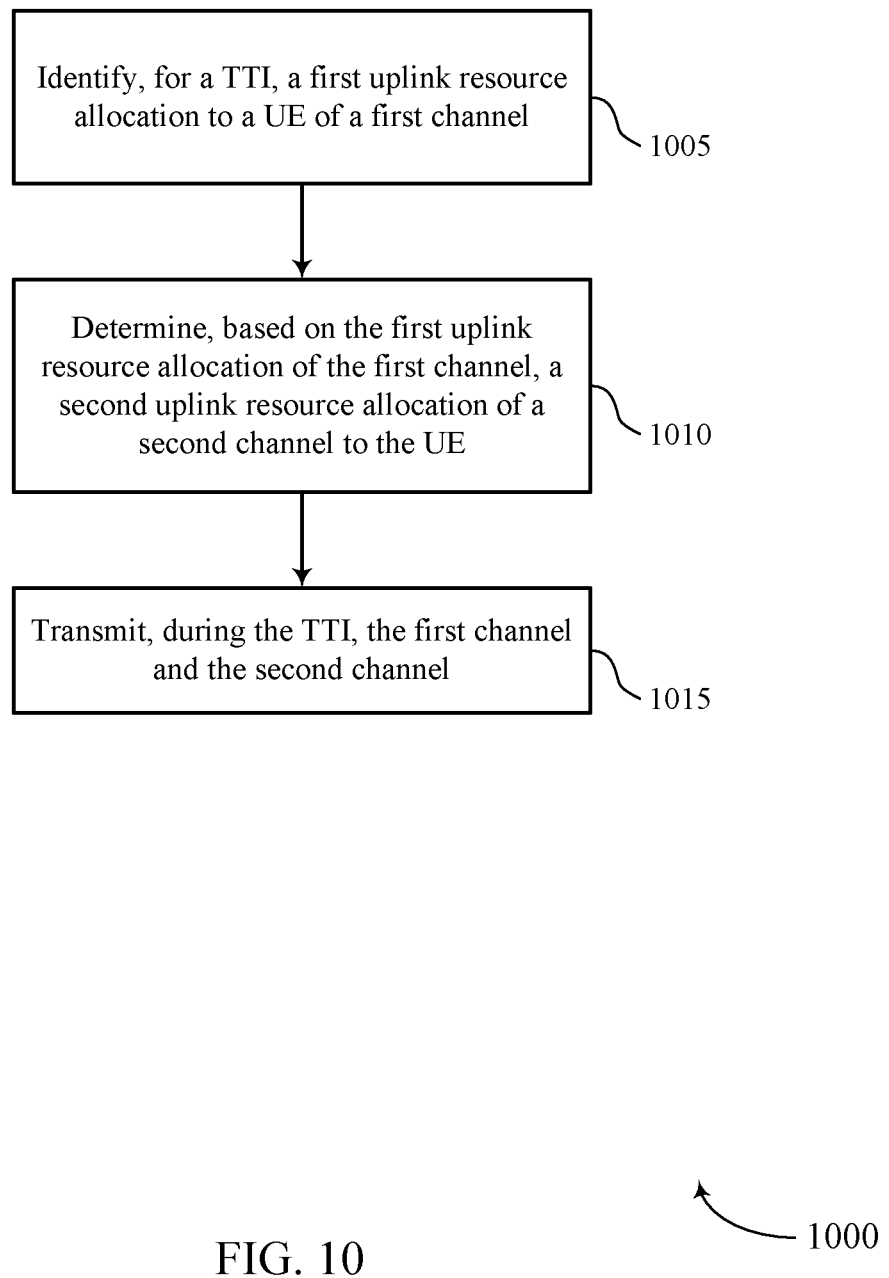
FIGS. 10 through 12 illustrate methods for data channel-referenced resource allocation for a control channel in accordance with one or more aspects of the present disclosure.

FIG. 10 shows a flowchart illustrating a method 1000 for data channel-referenced resource allocation for a control channel in accordance with various aspects of the present disclosure. The operations of method 1000 may be implemented by a UE 115 or its components as described herein. For example, the operations of method 1000 may be performed by a mapper manager as described with reference to FIGS. 6 through 9. In some examples, a UE 115 may execute a set of codes to control the functional elements of the device to perform the functions described below. Additionally or alternatively, the UE 115 may perform aspects of the functions described below using special-purpose hardware.

At block 1005 the UE 115 may identify, for a TTI, a first uplink resource allocation to the UE 115 of a first channel. The operations of block 1005 may be performed according to the methods described with reference to FIGS. 1 through 5B. In certain examples, aspects of the operations of block 1005 may be performed by a Resource Allocator as described with reference to FIGS. 6 through 9.

At block 1010 the UE 115 may determine, based at least in part on the first uplink resource allocation of the first channel, a second uplink resource allocation of a second channel to the UE 115. The operations of block 1010 may be performed according to the methods described with reference to FIGS. 1 through 5B. In certain examples, aspects of the operations of block 1010 may be performed by a Resource Allocator as described with reference to FIGS. 6 through 9.

At block 1015 the UE 115 may transmit, during the TTI, the first channel and the second channel. The operations of block 1015 may be performed according to the methods described with reference to FIGS. 1 through 5B. In certain examples, aspects of the operations of block 1015 may be performed by a transmitter as described with reference to FIGS. 6 through 9.

Figure 11:
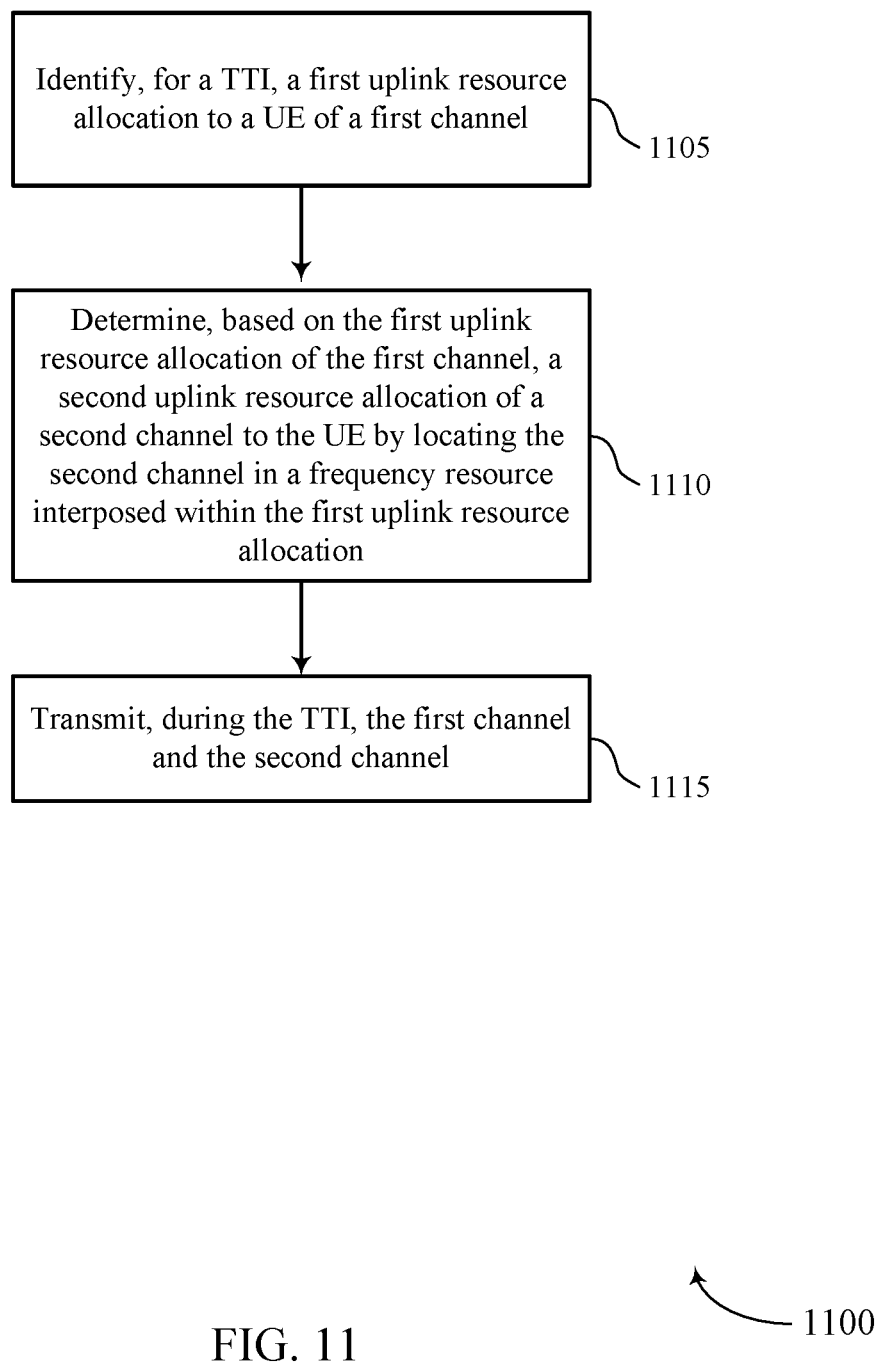

FIG. 11 shows a flowchart illustrating a method 1100 for data channel-referenced resource allocation for a control channel in accordance with various aspects of the present disclosure. The operations of method 1100 may be implemented by a UE 115 or its components as described herein. For example, the operations of method 1100 may be performed by a mapper manager as described with reference to FIGS. 6 through 9. In some examples, a UE 115 may execute a set of codes to control the functional elements of the device to perform the functions described below. Additionally or alternatively, the UE 115 may perform aspects of the functions described below using special-purpose hardware.

At block 1105 the UE 115 may identify, for a TTI, a first uplink resource allocation to the UE 115 of a first channel. In some cases, the UE 115 may determine, for a TTI, an uplink resource allocation to the UE 115 of a physical shared channel for a first transmission channel, the uplink resource allocation including a set of resource blocks, each of the set of resource blocks including a set of subcarriers of a carrier. The operations of block 1105 may be performed according to the methods described with reference to FIGS. 1 through 5B. In certain examples, aspects of the operations of block 1105 may be performed by a Resource Allocator as described with reference to FIGS. 6 through 9.

At block 1110 the UE 115 may determine, based at least in part on the first uplink resource allocation of the first channel, a second uplink resource allocation of a second channel to the UE 115 by locating the second channel in a frequency resource interposed within the first uplink resource allocation. In some cases, the UE 115 may determine, based at least in part on the uplink resource allocation, at least a portion of a resource block of the physical shared channel for carrying a second transmission channel. The operations of block 1110 may be performed according to the methods described with reference to FIGS. 1 through 5B. In certain examples, aspects of the operations of block 1110 may be performed by a Resource Allocator as described with reference to FIGS. 6 through 9.

At block 1115 the UE 115 may transmit, during the TTI, the first channel and the second channel. In some cases, the UE 115 may perform Discrete Fourier Transform (DFT) precoding on data to obtain DFT-precoded data symbols, map the DFT-precoded data symbols to the first transmission channel separately from mapping of uplink control information to the second transmission channel, and transmit, during the transmission time interval, information of a first type mapped to the first transmission channel and information of a second type mapped to the second transmission channel. The operations of block 1115 may be performed according to the methods described with reference to FIGS. 1 through 5B. In certain examples, aspects of the operations of block 1115 may be performed by a precoder, a Mapper Component, a transmitter, or any combination thereof, as described with reference to FIGS. 6 through 9.

Figure 12:
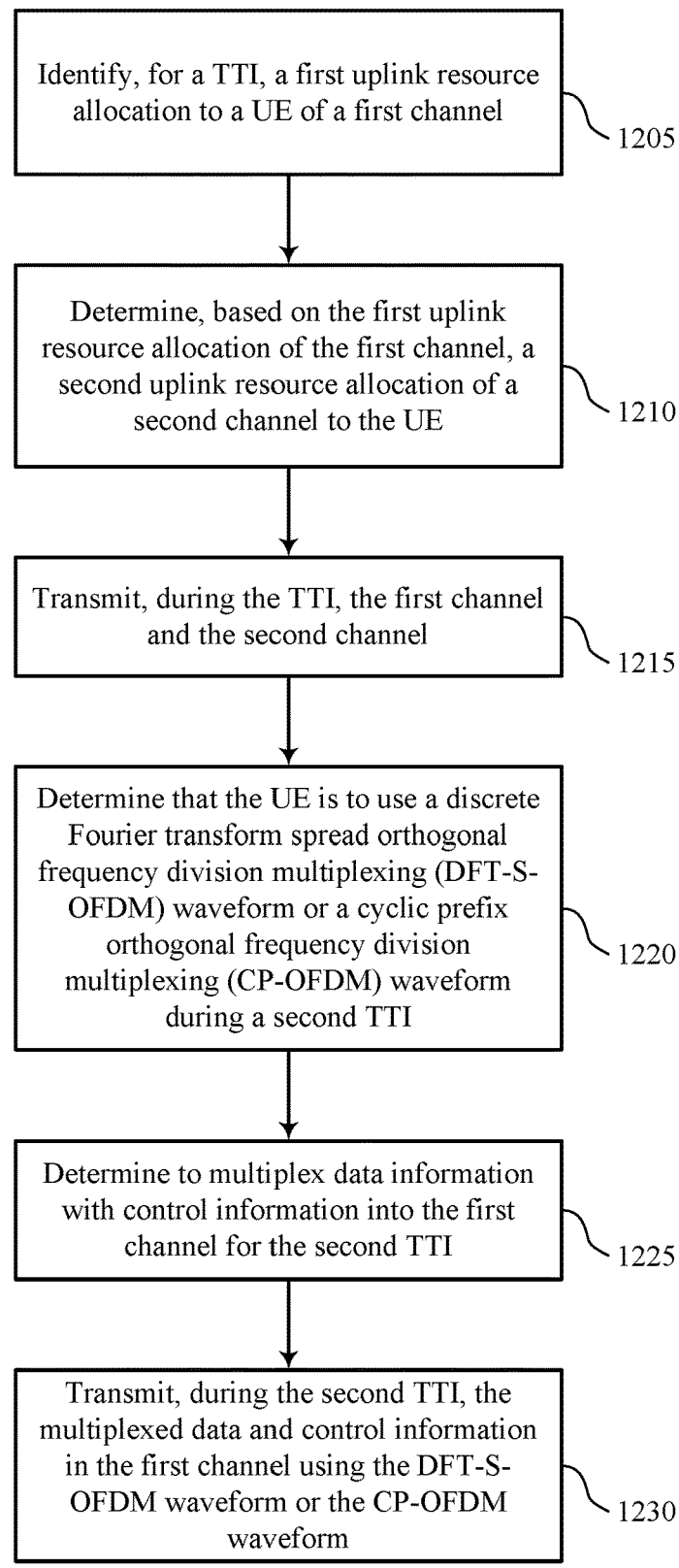

FIG. 12 shows a flowchart illustrating a method 1200 for data channel-referenced resource allocation for a control channel in accordance with various aspects of the present disclosure. The operations of method 1200 may be implemented by a UE 115 or its components as described herein. For example, the operations of method 1200 may be performed by a mapper manager as described with reference to FIGS. 6 through 9. In some examples, a UE 115 may execute a set of codes to control the functional elements of the device to perform the functions described below. Additionally or alternatively, the UE 115 may perform aspects of the functions described below using special-purpose hardware.

At block 1205 the UE 115 may identify, for a TTI, a first uplink resource allocation to the UE 115 of a first channel. The operations of block 1205 may be performed according to the methods described with reference to FIGS. 1 through 5B. In certain examples, aspects of the operations of block 1205 may be performed by a Resource Allocator as described with reference to FIGS. 6 through 9.

At block 1210 the UE 115 may determine, based at least in part on the first uplink resource allocation of the first channel, a second uplink resource allocation of a second channel to the UE 115. The operations of block 1210 may be performed according to the methods described with reference to FIGS. 1 through 5B. In certain examples, aspects of the operations of block 1210 may be performed by a Resource Allocator as described with reference to FIGS. 6 through 9.

At block 1215 the UE 115 may transmit, during the TTI, the first channel and the second channel. In some examples, a CP-OFDM or DFT-S-OFDM waveform may be generated for the first channel, and a CP-OFDM or DFT-S-OFDM waveform may be generated for the second channel to be transmitted concurrently in the TTI with the first channel. The operations of block 1215 may be performed according to the methods described with reference to FIGS. 1 through 5B. In certain examples, aspects of the operations of block 1215 may be performed by a transmitter as described with reference to FIGS. 6 through 9. As described above, the UE 115 may determine to transmit control information in different ways based on a waveform type of the first channel, which may vary from TTI to TTI.

At block 1220 the UE 115 may determine that the UE is to use a DFT-S-OFDM waveform or a CP-OFDM waveform during a second TTI. The operations of block 1220 may be performed according to the methods described with reference to FIGS. 1 through 5B. In certain examples, aspects of the operations of block 1220 may be performed by a Resource Allocator as described with reference to FIGS. 6 through 9.

At block 1225 the UE 115 may determine to multiplex data information with control information into the first channel for the second TTI. The operations of block 1225 may be performed according to the methods described with reference to FIGS. 1 through 5B. In certain examples, aspects of the operations of block 1225 may be performed by a Resource Allocator as described with reference to FIGS. 6 through 9.

At block 1230 the UE 115 may transmit, during the second TTI, the multiplexed data and control information in the first channel using the DFT-S-OFDM waveform or the CP-OFDM waveform. The operations of block 1230 may be performed according to the methods described with reference to FIGS. 1 through 5B. In certain examples, aspects of the operations of block 1230 may be performed by a Mapper Component and transmitter as described with reference to FIGS. 6 through 9.

It should be noted that the methods described above describe possible implementations, and that the operations and the steps may be rearranged or otherwise modified and that other implementations are possible. Furthermore, aspects from two or more of the methods may be combined.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. The terms "system" and "network" are often used interchangeably. A code division multiple access (CDMA) system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A time division multiple access (TDMA) system may implement a radio technology such as Global System for Mobile Communications (GSM).

An orthogonal frequency division multiple access (OFDMA) system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications system (UMTS). 3GPP Long Term Evolution (LTE) and LTE-Advanced (LTE-A) are releases of Universal Mobile Telecommunications System (UMTS) that use E-UTRA. UTRA, E-UTRA, UMTS, LTE, LTE-A, NR, and Global System for Mobile communications (GSM) are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies. While aspects an LTE or an NR system may be described for purposes of example, and LTE or NR terminology may be used in much of the description, the techniques described herein are applicable beyond LTE or NR applications.

In LTE/LTE-A networks, including such networks described herein, the term evolved node B (eNB) may be generally used to describe the base stations. The wireless communications system or systems described herein may include a heterogeneous LTE/LTE-A or NR network in which different types of evolved node B (eNBs) provide coverage for various geographical regions. For example, each eNB, gNB or base station may provide communication coverage for a macro cell, a small cell, or other types of cell. The term "cell" may be used to describe a base station, a carrier or component carrier associated with a base station, or a coverage area (e.g., sector, etc.) of a carrier or base station, depending on context.

Base stations may include or may be referred to by those skilled in the art as a base transceiver station, a radio base station, an access point, a radio transceiver, a NodeB, eNodeB (eNB), next generation NodeB (gNB), Home NodeB, a Home eNodeB, or some other suitable terminology. The geographic coverage area for a base station may be divided into sectors making up only a portion of the coverage area. The wireless communications system or systems described herein may include base stations of different types (e.g., macro or small cell base stations). The UEs described herein may be able to communicate with various types of base stations and network equipment including macro eNBs, small cell eNBs, gNBs, relay base stations, and the like. There may be overlapping geographic coverage areas for different technologies.

A macro cell generally covers a relatively large geographic area (e.g., several kilometers in radius) and may allow unrestricted access by UEs with service subscriptions with the network provider. A small cell is a lower-powered base station, as compared with a macro cell, that may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs with service subscriptions with the network provider. A femto cell may also cover a small geographic area (e.g., a home) and may provide restricted access by UEs having an association with the femto cell (e.g., UEs in a closed subscriber group (CSG), UEs for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells (e.g., component carriers).

The wireless communications system or systems described herein may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. The techniques described herein may be used for either synchronous or asynchronous operations.

The downlink transmissions described herein may also be called forward link transmissions while the uplink transmissions may also be called reverse link transmissions. Each communication link described herein—including, for example, wireless communications system 100 of FIG. 1—may include one or more carriers, where each carrier may be a signal made up of multiple sub-carriers (e.g., waveform signals of different frequencies).

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may comprise RAM, ROM, electrically erasable programmable read only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, digital subscriber line (DSL), or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communication, comprising:
identifying, for a transmission time interval (TTI), a first uplink frequency resource allocation to a user equipment (UE) of a first channel;
determining a modulation and coding scheme (MCS) index associated with the TTI;
determining, based at least in part on the first uplink frequency resource allocation of the first channel, a second uplink frequency resource allocation that is physically contiguous with the first uplink frequency resource allocation at least during a portion of the TTI;
selecting, based at least in part on the MCS index, a first waveform for the first channel and a second waveform for a second channel; and
transmitting, during the TTI, the first channel in the first uplink frequency resource allocation using the first waveform and the second channel in the second uplink frequency resource allocation using the second waveform.

2. The method of claim 1, wherein the first channel is a data channel and the second channel is a control channel.

3. The method of claim 1, wherein a size of the second uplink frequency resource allocation is determined based at least in part on a payload size of information carried on the second channel.

4. The method of claim 1, wherein the second channel is mapped to a first frequency location for a first portion of the TTI and a second frequency location for a second portion of the TTI.

5. The method of claim 1, wherein the determining of the second uplink frequency resource allocation comprises:

locating the second channel in a frequency resource adjacent to at least one of a lower boundary or an upper boundary of the first uplink frequency resource allocation.

6. The method of claim 1, wherein a size of the second uplink frequency resource allocation of the second channel is determined based at least in part on at least one of an indication in a control channel, a size of the first uplink frequency resource allocation of the first channel, a location of the first uplink frequency resource allocation of the first channel, a format of the second channel, a duration of the TTI, or a combination thereof.

7. The method of claim 1, wherein information of a first type is mapped to the first channel and information of a second type is mapped to the second channel.

8. The method of claim 7, wherein the information of the first type comprises data and the information of the second type comprises uplink control information.

9. The method of claim 8, further comprising:
mapping a first portion of the uplink control information to the first channel; and
mapping a second portion of the uplink control information to the second channel.

10. The method of claim 1, further comprising:
receiving an allocation message indicating the first uplink frequency resource allocation and a number of subcarriers for the second channel.

11. The method of claim 1, further comprising:
receiving an allocation message indicating the first uplink frequency resource allocation.

12. The method of claim 1, wherein the first uplink frequency resource allocation has a first granularity and the second uplink frequency resource allocation has a second granularity different from the first granularity.

13. The method of claim 1, wherein the second channel is orthogonalized to a channel for at least one other UE transmitted in at least a portion of the second uplink frequency resource allocation using a spreading code or a precoding matrix.

14. The method of claim 1, wherein the determining of the second uplink frequency resource allocation comprises:
locating the second channel in a frequency resource interposed within the first uplink frequency resource allocation.

15. The method of claim 14, wherein the second channel is not adjacent to a lower frequency boundary or an upper frequency boundary of the first uplink frequency resource allocation.

16. The method of claim 1, wherein the transmitting, during the TTI, the first channel and the second channel comprises:
generating a cyclic prefix orthogonal frequency division multiplexing (CP-OFDM) waveform for the first channel, wherein the first waveform comprises the CP-OFDM waveform; and
generating a discrete Fourier transform spread orthogonal frequency division multiplexing (DFT-S-OFDM) waveform for the second channel, wherein the second waveform comprises the DFT-S-OFDM waveform.

17. The method of claim 1, wherein the transmitting, during the TTI, the first channel and the second channel comprises:
generating a discrete Fourier transform spread orthogonal frequency division multiplexing (DFT-S-OFDM) waveform for the first channel, wherein the first waveform comprises the DFT-S-OFDM waveform; and
generating a second DFT-S-OFDM waveform for the second channel, wherein the second waveform comprises the second DFT-S-OFDM waveform.

18. The method of claim 1, further comprising:
determining that the UE is to use a discrete Fourier transform spread orthogonal frequency division multiplexing (DFT-S-OFDM) waveform or a cyclic prefix orthogonal frequency division multiplexing (CP-OFDM) waveform during a second TTI;
determining to multiplex data information with control information into the first channel for the second TTI; and
transmitting, during the second TTI, the multiplexed data and control information in the first channel using the DFT-S-OFDM waveform or the CP-OFDM waveform.

19. The method of claim 1, wherein the transmitting, during the TTI, the first channel and the second channel comprises:
determining, for the first channel, a plurality of precoding matrices associated with a plurality of layers for the TTI;
applying the plurality of precoding matrices to precode information of a first type for transmission of the first channel over the plurality of layers; and
applying one of the plurality of precoding matrices to precode information of a second type for transmission of the second channel over one of the plurality of layers.

20. The method of claim 1, wherein transmitting, during the TTI, the first channel and the second channel comprises:
time-division multiplexing the first channel with the second channel during the TTI.

21. The method of claim 20, further comprising:
determining to time-division multiplex the first channel with the second channel based at least in part on a duration of the TTI, a size of the first uplink frequency resource allocation of the first channel, a payload size of information carried on the second channel, or combinations thereof.

22. An apparatus for wireless communication, in a system comprising:
a processor;
memory coupled with the processor; and
instructions stored in the memory and operable, when executed by the processor, to cause the apparatus to:
identify, for a transmission time interval (TTI), a first uplink frequency resource allocation to a user equipment (UE) of a first channel;
determine a modulation and coding scheme (MCS) index associated with the TTI;
determine, based at least in part on the first uplink frequency resource allocation of the first channel, a second uplink frequency resource allocation that is physically contiguous with the first uplink frequency resource allocation at least during a portion of the TTI;
selecting, based at least in part on the MCS index, a first waveform for the first channel and a second waveform for a second channel; and
transmit, during the TTI, the first channel in the first uplink frequency resource allocation using the first waveform and the second channel in the second uplink frequency resource allocation using the second waveform.

23. The apparatus of claim 22, further comprising instructions that, when executed by the processor, cause the apparatus to:

locate the second channel in a frequency resource adjacent to at least one of a lower boundary or an upper boundary of the first uplink frequency resource allocation.

24. The apparatus of claim 22, further comprising instructions that, when executed by the processor, cause the apparatus to:
map information of a first type to the first channel and information of a second type to the second channel.

25. The apparatus of claim 22, wherein the instructions when executed by the processor to cause the apparatus to determine the second uplink frequency resource allocation further comprise instructions that, when executed by the processor, cause the apparatus to:
locate the second channel in a frequency resource interposed within the first uplink frequency resource allocation.

26. The apparatus of claim 22, further comprising instructions that, when executed by the processor, cause the apparatus to:
generate a cyclic prefix orthogonal frequency division multiplexing (CP-OFDM) waveform for the first channel, wherein the first waveform comprises the CP-OFDM waveform; and
generate a discrete Fourier transform spread orthogonal frequency division multiplexing (DFT-S-OFDM) waveform for the second channel, wherein the second waveform comprises the DFT-S-OFDM waveform.

27. The apparatus of claim 22, further comprising instructions that, when executed by the processor, cause the apparatus to:
generate a discrete Fourier transform spread orthogonal frequency division multiplexing (DFT-S-OFDM) waveform for the first channel, wherein the first waveform comprises the DFT-S-OFDM waveform; and
generate a second DFT-S-OFDM waveform for the second channel, wherein the second waveform comprises the second DFT-S-OFDM waveform.

28. The apparatus of claim 22, further comprising instructions that, when executed by the processor, cause the apparatus to:
determine that the UE is to use a discrete Fourier transform spread orthogonal frequency division multiplexing (DFT-S-OFDM) waveform or a cyclic prefix orthogonal frequency division multiplexing (CP-OFDM) waveform during a second TTI;
determine to multiplex data information with control information into the first channel for the second TTI; and
transmit, during the second TTI, the multiplexed data and control information in the first channel using the DFT-S-OFDM waveform or the CP-OFDM waveform.

29. An apparatus for wireless communication, comprising:
means for identifying, for a transmission time interval (TTI), a first uplink frequency resource allocation to a user equipment (UE) of a first channel;
means for determining a modulation and coding scheme (MCS) index associated with the TTI;
means for determining, based at least in part on the first uplink frequency resource allocation of the first channel, a second uplink frequency resource allocation that is physically contiguous with the first uplink frequency resource allocation at least during a portion of the TTI;
means for selecting, based at least in part on the MCS index, a first waveform for the first channel and a second waveform for a second channel; and
means for transmitting, during the TTI, the first channel in the first uplink frequency resource allocation using the first waveform and the second channel in the second uplink frequency resource allocation using the second waveform.

30. A non-transitory computer readable medium storing code for wireless communication, the code comprising instructions executable by a processor to:
identify, for a transmission time interval (TTI), a first uplink frequency resource allocation to a user equipment (UE) of a first channel;
determine a modulation and coding scheme (MCS) index associated with the TTI;
determine, based at least in part on the first uplink frequency resource allocation of the first channel, a second uplink frequency resource allocation that is physically contiguous with the first uplink frequency resource allocation at least during a portion of the TTI;
selecting, based at least in part on the MCS index, a first waveform for the first channel and a second waveform for a second channel; and
transmit, during the TTI, the first channel in the first uplink frequency resource allocation using the first waveform and the second channel in the second uplink frequency resource allocation using the second waveform.

* * * * *